(12) United States Patent
Abotabl et al.

(10) Patent No.: US 12,477,368 B2
(45) Date of Patent: Nov. 18, 2025

(54) DISTRIBUTED CROSS-LINK INTERFERENCE (CLI) MANAGEMENT

(71) Applicant: QUALCOMM Incorporated, San Diego, CA (US)

(72) Inventors: Ahmed Attia Abotabl, San Diego, CA (US); Muhammad Sayed Khairy Abdelghaffar, San Jose, CA (US); Abdelrahman Mohamed Ahmed Mohamed Ibrahim, San Diego, CA (US); Huilin Xu, Temecula, CA (US); Thomas Valerrian Pasca Santhappan, San Diego, CA (US); Seyedkianoush Hosseini, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 503 days.

(21) Appl. No.: 17/931,512

(22) Filed: Sep. 12, 2022

(65) Prior Publication Data

US 2024/0089767 A1    Mar. 14, 2024

(51) Int. Cl.
*H04W 24/10*    (2009.01)

(52) U.S. Cl.
CPC .................................. *H04W 24/10* (2013.01)

(58) Field of Classification Search
CPC ..................................................... H04W 24/10
See application file for complete search history.

(56) References Cited

U.S. PATENT DOCUMENTS

| 12,127,018 | B2 * | 10/2024 | Nam ..................... H04W 24/10 |
| 2020/0266908 | A1 * | 8/2020 | Qian ..................... H04L 5/0062 |
| 2020/0383118 | A1 * | 12/2020 | Park ..................... H04W 72/046 |
| 2021/0185654 | A1 * | 6/2021 | Taherzadeh Boroujeni ............... H04W 72/541 |
| 2021/0409993 | A1 * | 12/2021 | Fakoorian .............. H04B 17/24 |
| 2022/0021507 | A1 * | 1/2022 | Cao ..................... H04L 5/0091 |
| 2023/0125512 | A1 * | 4/2023 | Ibrahim .................. H04L 5/14 370/329 |
| 2023/0353262 | A1 * | 11/2023 | Ibrahim ............... H04W 24/10 |

* cited by examiner

*Primary Examiner* — Won Tae C Kim
(74) *Attorney, Agent, or Firm* — Polsinelli LLP

(57) ABSTRACT

Systems and techniques are provided for performing wireless communications. In some aspects, a use equipment (UE) may receive a crosslink interference (CLI) training session configuration from a network entity, wherein the CLI training session configuration corresponds to a CLI training session for a plurality of UEs including the UE. The UE may determine a CLI feedback information associated with performing the CLI training session and may transmit the CLI feedback information to the network entity. The CLI feedback information may be indicative of CLI between the UE and one or more additional UEs.

28 Claims, 17 Drawing Sheets

Standard (TS 38.213) table of slot format

| Format | Symbol number in a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | F | F | F | F | F | F | F | F | F | F | F | F | F | F |
| 3 | D | D | D | D | D | D | D | D | D | D | D | D | D | F |
| 4 | D | D | D | D | D | D | D | D | D | D | D | D | F | F |
| 5 | D | D | D | D | D | D | D | D | D | D | D | F | F | F |
| 6 | D | D | D | D | D | D | D | D | D | D | F | F | F | F |
| 7 | D | D | D | D | D | D | D | D | D | F | F | F | F | F |
| 8 | F | F | F | F | F | F | F | F | F | F | F | F | F | U |
| 9 | F | F | F | F | F | F | F | F | F | F | F | F | U | U |
| 10 | F | U | U | U | U | U | U | U | U | U | U | U | U | U |
| ... | ... | ... | ... | ... | ... | ... | ... | ... | ... | ... | ... | ... | ... | ... |
| 20 | D | D | F | F | F | F | F | F | F | F | F | F | F | U |
| 21 | D | D | D | F | F | F | F | F | F | F | F | F | F | U |
| 22 | D | F | F | F | F | F | F | F | F | F | F | F | F | U |
| ... | ... | ... | ... | ... | ... | ... | ... | ... | ... | ... | ... | ... | ... | ... |
| 54 | F | F | F | F | F | F | F | D | D | D | D | D | D | D |
| 55 | D | D | F | F | F | U | U | U | D | D | D | D | D | D |
| 56 – 254 | Reserved | | | | | | | | | | | | | |
| 255 | UE determines the slot format for the slot based on semi-static TDD UL/DL configuration and, if any, on detected DCI formats | | | | | | | | | | | | | |

FIG. 5

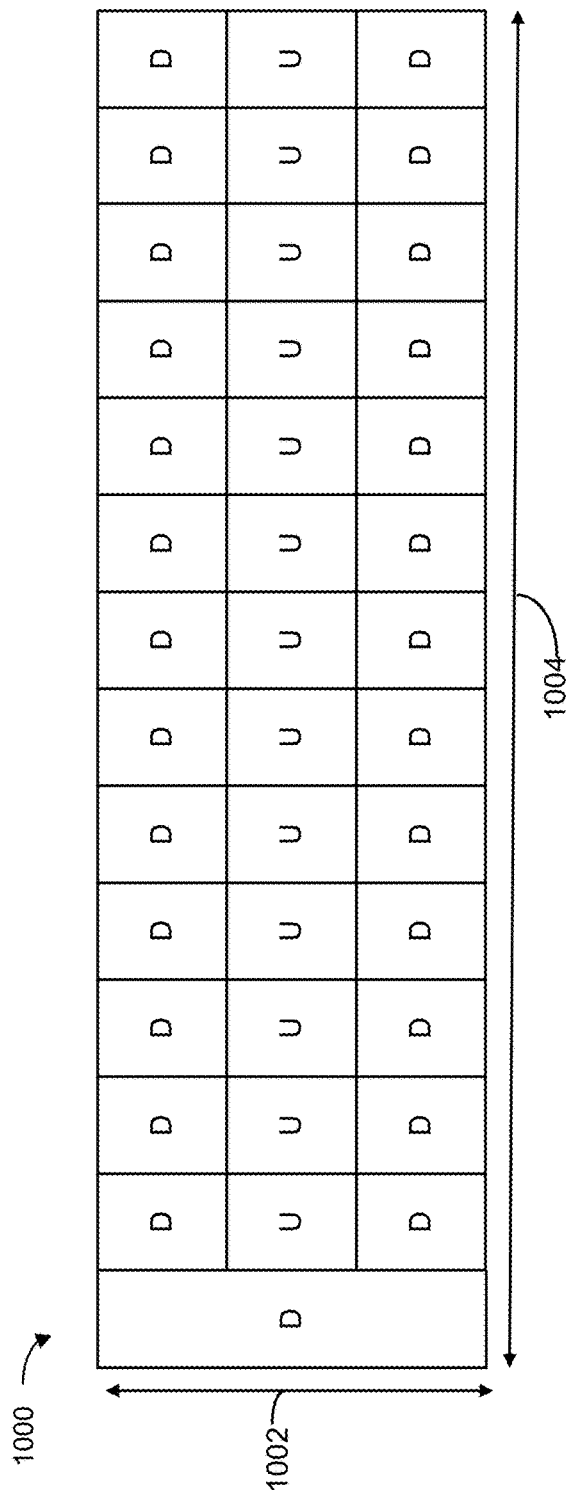
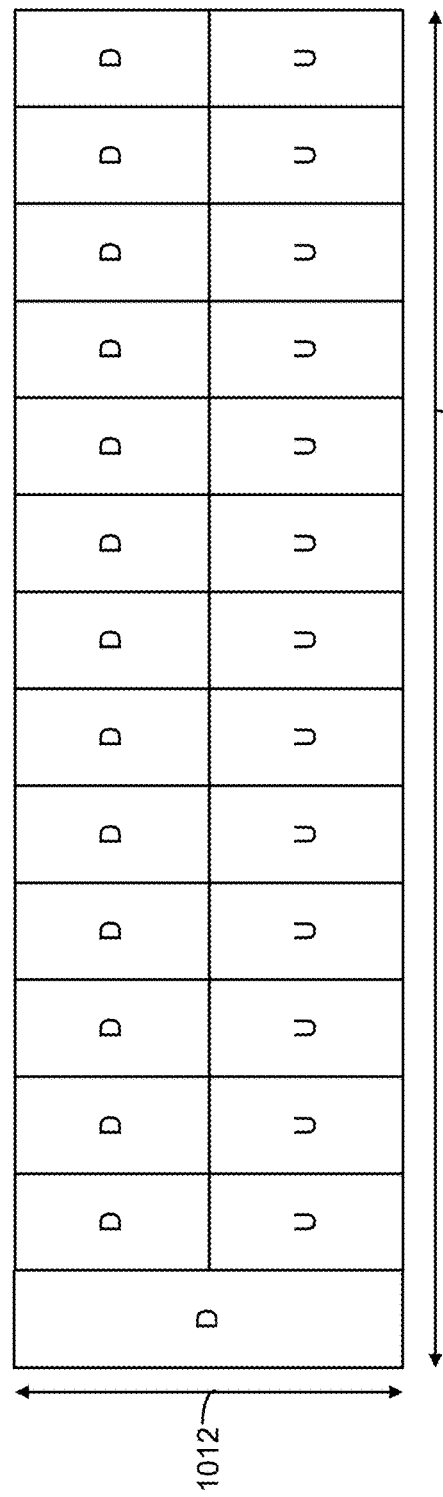
FIG. 10A
FIG. 10B

DISTRIBUTED CROSS-LINK INTERFERENCE (CLI) MANAGEMENT

FIELD OF THE DISCLOSURE

The present disclosure generally relates to cross-link interference (CLI) and management thereof for a base station communicating with a plurality of User Equipment (UE) devices.

BACKGROUND OF THE DISCLOSURE

Wireless communications systems are widely deployed to provide various types of communication content, such as voice, video, packet data, messaging, and broadcast. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE). Some wireless communications systems may support communications between UEs, which may involve direct transmissions between two or more UEs.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

Systems and techniques are described for providing cross-link interference (CLI) determination and management for a plurality of User Equipment (UE) devices. For example, wireless multiple-access communication systems may allow uplink transmission from different user equipment (UE) to network entities (e.g., base stations, such as gNodeBs (gNBs)) and downlink reception from network entities to different UEs. In some cases, crosslink interference (CLI) may occur between one or more UEs. For example, inter-UE CLI can occur when an uplink (UL) transmission from a first UE to a base station interferes with a downlink (DL) transmission from a base station to a second UE. In some aspects, interference between a UL transmission by a first UE (e.g., also referred to as an aggressor UE) and a DL reception by a second UE (e.g., also referred to as a victim UE) can be referred to as CLI, wherein the victim UE experiences interference in its DL reception.

As described in more detail herein, systems and techniques are described for providing distributed aggressor and victim UE determination for CLI management. In some aspects, the systems and techniques include performing one or more CLI measurement and reporting training session iterations, wherein each CLI measurement and reporting training session iteration is configured based on a base station (e.g., gNB) transmitting configuration information to a plurality of UEs. The training information can configure one or more parameters for performing the one or more CLI measurement and reporting training session iterations. For example, in a first training session iteration, a first set of transmitting UEs (e.g., aggressor UEs) can be configured to transmit a CLI reference signal (RS) and a second set of receiving UEs (e.g., victim UEs) can be configured to measure one or more of the transmitted CLI RSs. In some aspects, the CLI RS can include an aperiodic (AP), semi-periodic (SP), or periodic (P) non-zero power (NZP) Sounding Reference Signal (SRS). In some aspects, one or more additional training session iterations can be configured by the base station or gNB, wherein the one or more additional training session iterations utilize a set of transmitting (e.g., aggressor) UEs and a set of receiving (e.g., victim) UEs that is different than those utilized in the first training session iteration and/or prior training session iterations. In each training session iteration, some (or all) of the UEs included in the plurality of UEs can generate and transmit feedback information indicative of CLI information determined during the training session iteration. For example, a receiving (e.g., victim) UE can generate and transmit feedback information indicative of a Received Reference Signal Power (RSRP) or a Received Signal Strength Indicator (RSSI) for each NZP-SRS measured by the victim UE for one or more aggressor UEs. Based on performing one or more training session iterations, the plurality of UEs can perform a distributed determination of community grouping, wherein the plurality of UEs identify aggressor and victim UEs (e.g., and/or an associated strength of CLI, based on RSRP or RSSI) and transmit the distributed determination information to a base station or gNB for CLI management.

According to at least one illustrative example, an apparatus of a user equipment (UE) for wireless communications is provided that includes at least one memory (e.g., configured to store data) and at least one processor (e.g., implemented in circuitry) coupled to the at least one memory. The at least one processor is configured to and can: receive a crosslink interference (CLI) training session configuration from a network entity, wherein the CLI training session configuration corresponds to a CLI training session for a plurality of UEs including the UE; determine a CLI feedback information associated with performing the CLI training session; and transmit the CLI feedback information, wherein the CLI feedback information is indicative of CLI between the UE and one or more additional UEs.

In another example, a method of wireless communications performed at a user equipment (UE) is provided. The method includes: receiving, at the UE, a crosslink interference (CLI) training session configuration from a network entity, wherein the CLI training session configuration corresponds to a CLI training session for a plurality of UEs including the UE; determining, at the UE, a CLI feedback information associated with performing the CLI training session; and transmitting the CLI feedback information, wherein the CLI feedback information is indicative of CLI between the UE and one or more additional UEs.

In another example, a non-transitory computer-readable medium is provided that has stored thereon instructions that, when executed by one or more processors, cause the one or more processors to: receive a crosslink interference (CLI) training session configuration from a network entity, wherein the CLI training session configuration corresponds to a CLI training session for a plurality of UEs including the UE; determine a CLI feedback information associated with performing the CLI training session; and transmit the CLI feedback information, wherein the CLI feedback information is indicative of CLI between the UE and one or more additional UEs.

In another example, an apparatus for wireless communications performed at a user equipment (UE) is provided. The apparatus includes: means for receiving, at the UE, a crosslink interference (CLI) training session configuration from a network entity, wherein the CLI training session configuration corresponds to a CLI training session for a plurality of UEs including the UE; means for determining, at the UE, a CLI feedback information associated with performing the CLI training session; and means for transmitting the CLI feedback information, wherein the CLI feedback information is indicative of CLI between the UE and one or more additional UEs.

In another example, an apparatus of a network entity for wireless communications is provided that includes at least one memory (e.g., configured to store data) and at least one processor (e.g., implemented in circuitry) coupled to the at least one memory. The at least one processor is configured to and can: transmit, to a user equipment (UE), a crosslink interference (CLI) training session configuration, wherein the CLI training session configuration corresponds to a CLI training session for a plurality of UEs including the UE; and receive, from the UE, a CLI feedback information associated with performing the CLI training session based on the CLI training session configuration, wherein the CLI feedback information is indicative of CLI between the UE and one or more additional UEs.

In another example, a method of wireless communications performed at a network entity is provided. The method includes: transmitting, to a user equipment (UE), a crosslink interference (CLI) training session configuration, wherein the CLI training session configuration corresponds to a CLI training session for a plurality of UEs including the UE; and receiving, from the UE, a CLI feedback information associated with performing the CLI training session based on the CLI training session configuration, wherein the CLI feedback information is indicative of CLU between the UE and one or more additional UEs.

In another example, a non-transitory computer-readable medium is provided that has stored thereon instructions that, when executed by one or more processors, cause the one or more processors to: transmit, to a user equipment (UE), a crosslink interference (CLI) training session configuration, wherein the CLI training session configuration corresponds to a CLI training session for a plurality of UEs including the UE; and receive, from the UE, a CLI feedback information associated with performing the CLI training session based on the CLI training session configuration, wherein the CLI feedback information is indicative of CLI between the UE and one or more additional UEs.

In another example, an apparatus for wireless communications performed at a network entity is provided. The apparatus includes: means for transmitting, to a user equipment (UE), a crosslink interference (CLI) training session configuration, wherein the CLI training session configuration corresponds to a CLI training session for a plurality of UEs including the UE; and means for receiving, from the UE, a CLI feedback information associated with performing the CLI training session based on the CLI training session configuration, wherein the CLI feedback information is indicative of CLU between the UE and one or more additional UEs.

In some aspects, the apparatus is, or is part of, a mobile device (e.g., a mobile telephone or so-called "smart phone" or other mobile device), a wearable device, an extended reality (XR) device (e.g., a virtual reality (VR) device, an augmented reality (AR) device, or a mixed reality (MR) device), a personal computer, a laptop computer, a tablet computer, an Internet-of-Things (IoT) device, a wireless access point, a vehicle or component of a vehicle, a server computer, a robotics device, or other device. In some aspects, the apparatus includes radio detection and ranging (radar) for capturing radio frequency (RF) signals. In some aspects, the apparatus includes light detection and ranging (LIDAR) for capturing optical frequency signals. In some aspects, the apparatus includes a camera or multiple cameras for capturing one or more images. In some aspects, the apparatus further includes a display for displaying one or more images, notifications, and/or other displayable data. In some aspects, the apparatuses described above can include one or more sensors, which can be used for determining a location of the apparatuses, a state of the apparatuses (e.g., a temperature, a humidity level, and/or other state), and/or for other purposes.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

FIG. 5 is a diagram illustrating an example of a slot format table, which may be employed by the disclosed systems and techniques, in accordance with some examples;

FIG. 10A and FIG. 10B are diagrams illustrating examples of sub-band full duplex (SBFD) configurations, in accordance with some examples;

DETAILED DESCRIPTION

Figure 1:
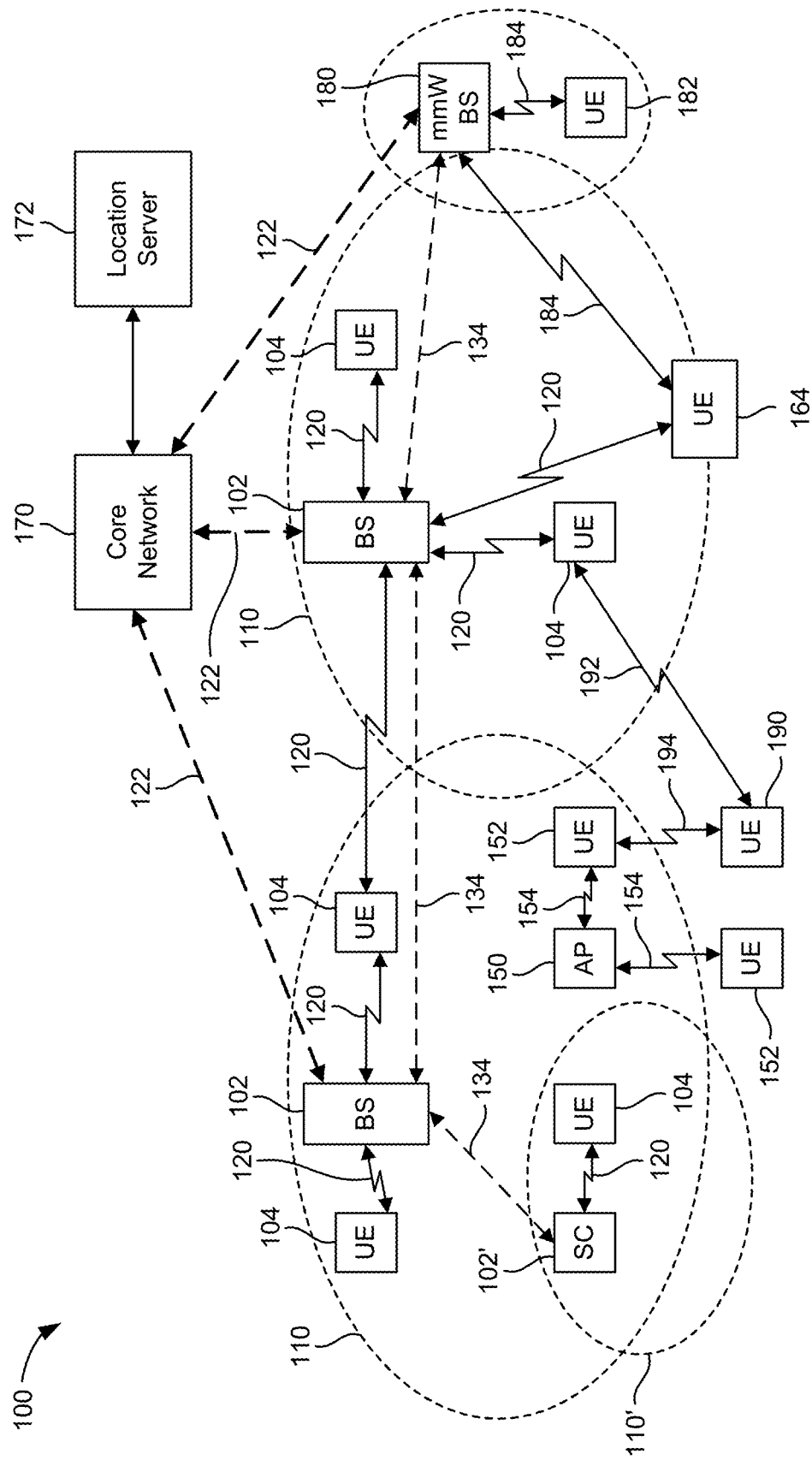
FIG. 1 is a block diagram illustrating an example of a wireless communication network that may be employed by the disclosed systems and techniques, in accordance with some examples.

Certain aspects and examples of this disclosure are provided below for illustration purposes. Alternate aspects may be devised without departing from the scope of the disclosure. Additionally, well-known elements of the disclosure will not be described in detail or will be omitted so as not to obscure the relevant details of the disclosure. Some of the aspects and examples described herein may be applied independently and some of them may be applied in combination as would be apparent to those of skill in the art. In the following description, for the purposes of explanation, specific details are set forth in order to provide a thorough understanding of aspects and examples of the disclosure. However, it will be apparent that various aspects and examples may be practiced without these specific details. The figures and description are not intended to be restrictive.

The ensuing description provides example aspects, and is not intended to limit the scope, applicability, or configuration of the disclosure. Rather, the ensuing description of the exemplary aspects will provide those skilled in the art with an enabling description for implementing examples and aspects of the disclosure. It should be understood that various changes may be made in the function and arrangement of elements without departing from the scope of the application as set forth in the appended claims.

A wireless multiple-access communications system may employ various techniques for performing uplink transmission from and downlink reception to different user equipment (UE). In one illustrative example, a communications system may utilize time division duplexing (TDD) for communications. In some cases, neighboring cells within the system may have different TDD configurations that may cause an overlap in conflicting communications, including between transmissions and/or receptions to and from UEs. For example, an uplink transmission by a first UE may interfere (overlap) with a downlink reception by a second UE if the uplink transmission and the downlink reception are scheduled to use the same frequency at the same time. In another illustrative example, a communications system may utilize full duplexing (FD), which can also lead to interference between transmissions and receptions from and to UEs. This type of interference between an uplink transmission by a first UE (an aggressor UE) and a downlink reception by a second UE (a victim UE) is referred to as cross-link interference (CLI).

Systems, apparatuses, processes (also referred to as methods), and computer-readable media (collectively referred to herein as systems and techniques) are described herein for providing cross-link interference (CLI) determination and management for a plurality of User Equipment (UE) devices. In some aspects, crosslink interference (CLI) may occur between one or more UEs. For example, inter-UE CLI can occur when an uplink (UL) transmission from a first UE to a base station interferes with a downlink (DL) transmission from a base station to a second UE. In some aspects, interference between a UL transmission by a first UE (e.g., also referred to as an aggressor UE) and a DL reception by a second UE (e.g., also referred to as a victim UE) can be referred to as CLI, wherein the victim UE experiences interference in its DL reception.

In some aspects, the disclosed systems and techniques can be used to provide distributed aggressor and victim UE determination for CLI management. In some aspects, the systems and techniques include performing one or more CLI measurement and reporting training session iterations, wherein each CLI measurement and reporting training session iteration is configured based on a base station (e.g., gNB) transmitting configuration information to a plurality of UEs. The training information can configure one or more parameters for performing the one or more CLI measurement and reporting training session iterations.

For example, the systems and techniques can include receiving, at a UE, a crosslink interference (CLI) training session configuration from a network entity, wherein the CLI training session configuration is transmitted to a plurality of UEs including the UE. In some aspects, the UE can transmit, to a network entity, a CLI feedback information, wherein the CLI feedback information is indicative of CLI between the UE and one or more additional UEs included in the plurality of UEs. For example, in a first training session iteration, a first set of transmitting UEs (e.g., aggressor UEs) can be configured to transmit a CLI reference signal (RS) and a second set of receiving UEs (e.g., victim UEs) can be configured to measure one or more of the transmitted CLI RSs. In some aspects, the CLI RS can include an aperiodic (AP), semi-periodic (SP), or periodic (P) non-zero power (NZP) Sounding Reference Signal (SRS). In some aspects, one or more additional training session iterations can be configured by the base station or gNB, wherein the one or more additional training session iterations utilize a set of transmitting (e.g., aggressor) UEs and a set of receiving (e.g., victim) UEs that is different than those utilized in the first training session iteration and/or prior training session iterations.

In each training session iteration, some (or all) of the UEs included in the plurality of UEs can generate and transmit feedback information indicative of CLI information determined during the training session iteration. For example, a receiving (e.g., victim) UE can generate and transmit feedback information indicative of a Received Reference Signal Power (RSRP) or a Received Signal Strength Indicator (RSSI) for each NZP-SRS measured by the victim UE for one or more aggressor UEs. Based on performing one or more training session iterations, the plurality of UEs can perform a distributed determination of community grouping, wherein the plurality of UEs identify aggressor and victim UEs (e.g., and/or an associated strength of CLI, based on RSRP or RSSI) and transmit the distributed determination information to a base station or gNB for CLI management.

Additional details regarding the disclosed systems and methods for providing CLI cancellation, as well as specific implementations, are described below.

As used herein, the terms "user equipment" (UE) and "network entity" are not intended to be specific or otherwise limited to any particular radio access technology (RAT), unless otherwise noted. In general, a UE may be any wireless communication device (e.g., a mobile phone, router, tablet computer, laptop computer, and/or tracking device, etc.), wearable (e.g., smartwatch, smart-glasses, wearable ring, and/or an extended reality (XR) device such as a virtual reality (VR) headset, an augmented reality (AR) headset or glasses, or a mixed reality (MR) headset), vehicle (e.g., automobile, motorcycle, bicycle, etc.), and/or Internet of Things (IoT) device, etc., used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11 communication standards, etc.) and so on.

A network entity can be implemented in an aggregated or monolithic base station architecture, or alternatively, in a disaggregated base station architecture, and may include one or more of a central unit (CU), a distributed unit (DU), a radio unit (RU), a Near-Real Time (Near-RT) RAN Intelligent Controller (RIC), or a Non-Real Time (Non-RT) RIC. A base station (e.g., with an aggregated/monolithic base station architecture or disaggregated base station architecture) may operate according to one of several RATs in communication with UEs depending on the network in which it is deployed, and may be alternatively referred to as an access point (AP), a network node, a NodeB (NB), an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems, a base station may provide edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, or a forward traffic channel, etc.). The term traffic channel (TCH), as used herein, can refer to either an uplink, reverse or downlink, and/or a forward traffic channel.

The term "network entity" or "base station" (e.g., with an aggregated/monolithic base station architecture or disaggregated base station architecture) may refer to a single physical transmit receive point (TRP) or to multiple physical TRPs that may or may not be co-located. For example, where the term "network entity" or "base station" refers to a single physical TRP, the physical TRP may be an antenna of the base station corresponding to a cell (or several cell sectors) of the base station. Where the term "network entity" or "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals (or simply "reference signals") the UE is measuring. Because a TRP is the point from which a base station transmits and receives wireless signals, as used herein, references to transmission from or reception at a base station are to be understood as referring to a particular TRP of the base station.

In some implementations that support positioning of UEs, a network entity or base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An RF signal comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

FIG. 1 illustrates an example of a wireless communications system 100 that may be employed by the disclosed systems and techniques for CLI cancellation, according to various aspects. The wireless communications system 100 (which may also be referred to as a wireless wide area network (WWAN)) may include various base stations 102 and various user equipment devices (UEs) 104. As used herein, the term "UE" may be referred to interchangeably as an "access terminal" or "AT," a "user device," a "user terminal" or UT, a "client device," a "wireless device," a "subscriber device," a "subscriber terminal," a "subscriber station," a "mobile device," a "mobile terminal," a "mobile station," or variations thereof.

The base stations 102 may include macro cell base stations (high power cellular base stations) and/or small cell base stations (low power cellular base stations). In an aspect, the macro cell base station may include eNBs and/or ng-eNBs where the wireless communications system 100 corresponds to a 4G/LTE network, or gNBs where the wireless communications system 100 corresponds to a 5G/NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (which may be part of core network 170 or may be external to core network 170). In addition to other functions, the base stations 102 may perform functions that relate to one or more of transferring user data, radio channel ciphering and deciphering, integrity protection, header compression, mobility control functions (e.g., handover, dual connectivity), intra-cell interference coordination, inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired and/or wireless.

The base stations 102 may wirelessly communicate with the UEs 104. Each of the base stations 102 may provide communication coverage for a respective geographic coverage area 110. In one illustrative example, one or more cells may be supported by a base station 102 in each coverage area 110. A "cell" is a logical communication entity used for communication with a base station (e.g., over some frequency resource, referred to as a carrier frequency, component carrier (CC), carrier, band, or the like), and may be associated with an identifier (e.g., a physical cell identifier (PCI), a virtual cell identifier (VCI), a cell global identifier (CGI)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a coverage area 110' that substantially overlaps with the coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 (e.g., access links) between the base stations 102 and the UEs 104 may include uplink (also referred to as reverse link) transmissions from a UE 104 to a base station 102 and/or downlink (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available. In some examples, the wireless communications system 100 can include devices (e.g., UEs etc.) that communicate with one or more UEs 104, base stations 102, APs 150, etc. utilizing the ultra-wideband (UWB) spectrum. The UWB spectrum can range from 3.1 to 10.5 GHz.

The small cell base station 102' may operate in a licensed and/or an unlicensed frequency spectrum (e.g., utilizing LTE or NR technology and use the same 5 GHz unlicensed frequency spectrum as used by the WLAN AP 150). The wireless communications system 100 may further include a millimeter wave (mmW) base station 180 that may operate in mmW frequencies and/or near mmW frequencies in communication with a UE 182. In some cases, mmW frequencies can be referred to as the FR2 band (e.g., including a frequency range of 24250 MHz to 52600 MHz). In some examples, the wireless communications system 100 can include one or more base stations (referred to herein as "hybrid base stations") that operate in both the mmW frequencies (and/or near mmW frequencies) and in sub-6 GHz frequencies (referred to as the FR1 band, e.g., including a frequency range of 450 to 6000 MHz). In some examples, the mmW base station 180, one or more hybrid base stations (not shown), and the UE 182 may utilize beamforming (transmit and/or receive) over a mmW communication link 184 to compensate for the extremely high path loss and short range. The wireless communications system 100 may further include a UE 164 that may communicate with a macro cell base station 102 over a communication link 120 and/or the mmW base station 180 over a mmW communication link 184.

In some examples, in order to operate on multiple carrier frequencies, a base station 102 and/or a UE 104 may be equipped with multiple receivers and/or transmitters. For example, a UE 104 may have two receivers, "Receiver 1" and "Receiver 2," where "Receiver 1" is a multi-band receiver that can be tuned to band (e.g., carrier frequency) 'X' or band 'Y,' and "Receiver 2" is a one-band receiver tuneable to band 'Z' only.

The wireless communications system 100 may further include one or more UEs, such as UE 190, that connect indirectly to one or more communication networks via one or more relay devices (e.g., UEs) by using device-to-device (D2D) peer-to-peer (P2P) links (referred to as "sidelinks").

In the example of FIG. 1, UE 190 has a D2D P2P link 192 with one of the UEs 104, which can be configured to operate as a relay device (e.g., through which UE 190 may indirectly communicate with base station 102). In another example, UE 190 also has a D2D P2P link 194 with WLAN STA 152, which is connected to the WLAN AP 150 and can be configured to operate as a relay device (e.g., UE 190 may indirectly communicate with AP 150). In an example, the D2D P2P links 192 and 194 may be supported with any well-known D2D RAT, such as LTE Direct (LTE-D), Wi-Fi Direct (Wi-Fi-D), Bluetooth®, UWB, and so on.

As noted above, UE 104 and UE 190 can be configured to communicate using sidelink communications. In some examples, UE 104 and UE 190 can operate using one or more different modes for sidelink communications. For example, in mode 1 the cellular network (e.g., base station 102) can select and manage the radio resources used by the UEs for performing sidelink communications. In another example, the UE 104 and UE 190 can be configured to operate using mode 2 in which the UEs can autonomously select the radio resources for sidelink communications. Mode 2 can operate without cellular coverage, and in some cases can be considered a baseline sidelink communications mode as devices and/or applications may not depend on the availability of cellular coverage. In some examples, mode 2 can include a distributed scheduling scheme for UEs to select radio resources.

In some aspects, UE 104 and UE 190 can be configured to implement a multi-beam unicast link for sidelink communications. In some examples, UE 104 and UE 190 can use PC5 radio resource control (RRC) protocol to establish and maintain a multi-beam unicast link that can be used for sidelink communications. In some cases, a sidelink transmission can include a request for feedback (e.g., a hybrid automatic repeat request (HARQ)) from the receiving UE. In some instances, the feedback request can be included in the sidelink control information (SCI) (e.g., SCI 1 in Physical Sidelink Control Channel (PSCCH) and/or SCI 2 in Physical Sidelink Shared Channel (PSSCH)). In some aspects, the feedback can correspond to an acknowledgement (ACK) or a negative acknowledgement (NACK).

In some examples, a transmitting UE (e.g., UE 104 and/or UE 190) can use feedback information to select and/or perform beam maintenance of beam pairs associated with a unicast link for sidelink communications. For example, a transmitting UE can maintain one or more counters associated with one or more beam pairs and/or one or more component beams. In some aspects, the counters can be used to determine the reliability of a component beam and/or a beam pair. In some cases, a transmitting UE may increment a counter for a beam pair and/or a component beam based on a discontinuous transmission (DTX). For example, a transmitting UE may increment a counter for a component beam and/or a beam pair if it does not receive any response to a request for feedback for an associated sidelink transmission (e.g., receiving UE fails to decode SCI). In another example, a transmitting UE may increment a counter for a component beam and/or a beam pair if it receives a NACK in response to a sidelink transmission.

In some cases, a transmitting UE may initiate beam refinement based on a value of a counter corresponding to a number of DTXs associated with a component beam and/or a beam pair. In some aspects, a transmitting UE may initiate beam recovery based on a value of a counter corresponding to a number of DTXs associated with a component beam and/or a beam pair. In some examples, a transmitting UE may detect radio link failure (RLF) based on a value of a counter corresponding to a number of DTXs associated with a component beam and/or a beam pair.

Figure 2:
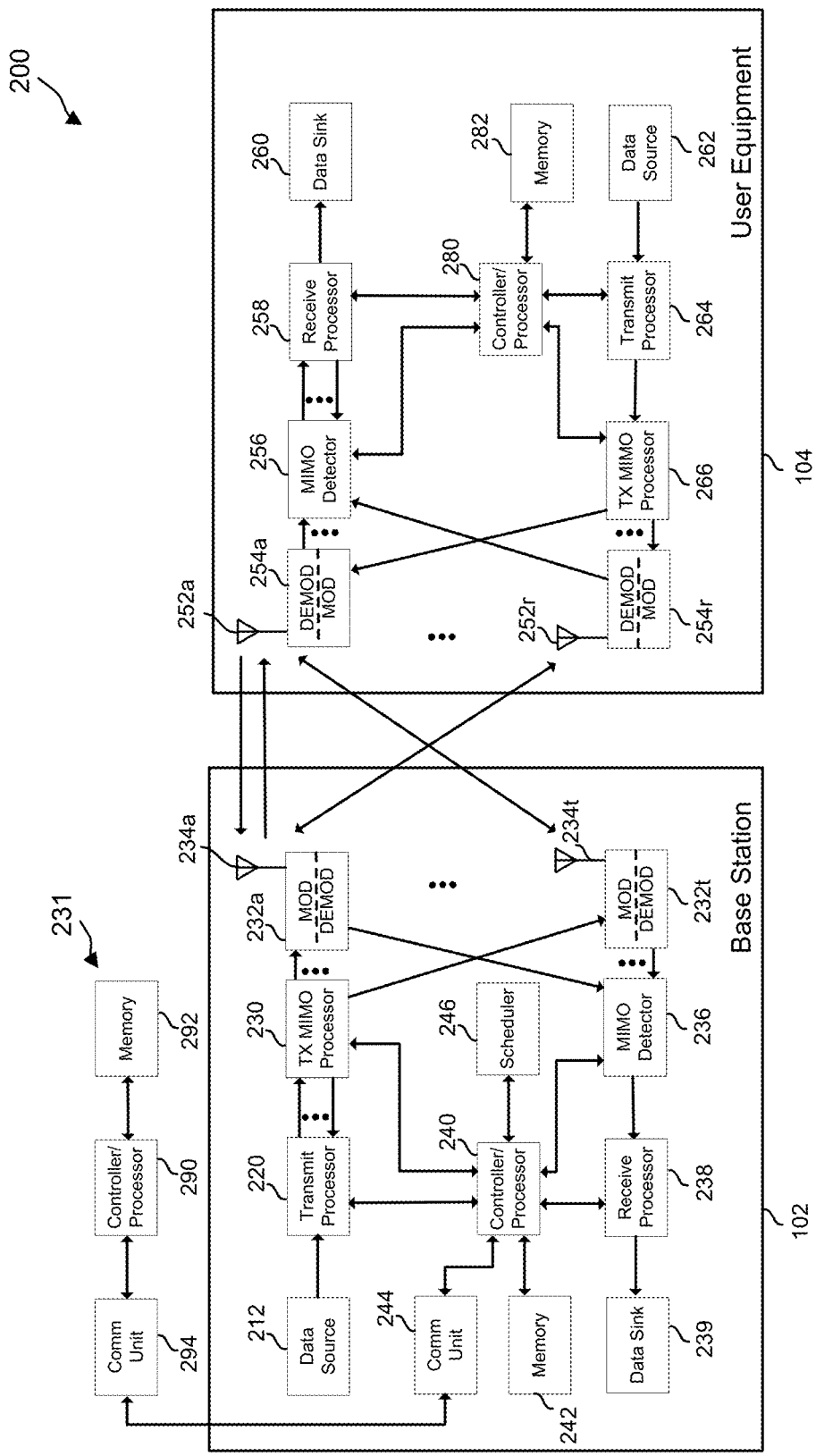
FIG. 2 is a diagram illustrating a design of a base station and a user equipment (UE) device that enable transmission and processing of signals exchanged between the UE and the base station, which may be employed by the disclosed systems and techniques, in accordance with some examples.

FIG. 2 shows a block diagram of a design of a base station 102 and a UE 104 that enable transmission and processing of signals exchanged between the UE and the base station, which may be employed by the disclosed systems and techniques for CLI cancellation, in accordance with some aspects of the present disclosure. Design 200 includes components of a base station 102 and a UE 104, which may be one of the base stations 102 and one of the UEs 104 in FIG. 1. Base station 102 may be equipped with T antennas 234a through 234t, and UE 104 may be equipped with R antennas 252a through 252r, where in general T≥1 and R≥1.

At base station 102, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. The modulators 232a through 232t are shown as a combined modulator-demodulator (MOD-DEMOD). In some cases, the modulators and demodulators can be separate components. Each modulator of the modulators 232a to 232t may process a respective output symbol stream, e.g., for an orthogonal frequency-division multiplexing (OFDM) scheme and/or the like, to obtain an output sample stream. Each modulator of the modulators 232a to 232t may further process (e.g., convert to analog, amplify, filter, and upconvert) the output sample stream to obtain a downlink signal. T downlink signals may be transmitted from modulators 232a to 232t via T antennas 234a through 234t, respectively. According to certain aspects described in more detail below, the synchronization signals can be generated with location encoding to convey additional information.

At UE 104, antennas 252a through 252r may receive the downlink signals from base station 102 and/or other base stations and may provide received signals to demodulators (DEMODs) 254a through 254r, respectively. The demodulators 254a through 254r are shown as a combined modulator-demodulator (MOD-DEMOD). In some cases, the modulators and demodulators can be separate components. Each demodulator of the demodulators 254a through 254r may condition (e.g., filter, amplify, downconvert, and digitize) a received signal to obtain input samples. Each demodulator of the demodulators 254a through 254r may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 104 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like.

On the uplink, at UE 104, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals (e.g., based at least in part on a beta value or a set of beta values associated with the one or more reference signals). The symbols from transmit processor 264 may be precoded by a TX-MIMO processor 266 if application, further processed by modulators 254a through 254r (e.g., for DFT-s-OFDM, CP-OFDM, and/or the like), and transmitted to base station 102. At base station 102, the uplink signals from UE 104 and other UEs may be received by antennas 234a through 234t, processed by demodulators 232a through 232t, detected by a MIMO detector 236 if applicable, and further processed by a receive processor 238 to obtain decoded data and control information sent by UE 104. Receive processor 238 may provide the decoded data to a data sink 239 and the decoded control information to controller (processor) 240. Base station 102 may include communication unit 244 and communicate to a network controller 231 via communication unit 244. Network controller 231 may include communication unit 294, controller/processor 290, and memory 292.

In some aspects, one or more components of UE 104 may be included in a housing. Controller 240 of base station 102, controller/processor 280 of UE 104, and/or any other component(s) of FIG. 2 may perform one or more techniques associated with providing CLI cancellation.

Memories 242 and 282 may store data and program codes for the base station 102 and the UE 104, respectively. A scheduler 246 may schedule UEs for data transmission on the downlink, uplink, and/or sidelink.

In some implementations, the UE 104 can include: means for receiving, at the UE, a crosslink interference (CLI) training session configuration from a network entity, wherein the CLI training session configuration is transmitted to a plurality of UEs including the UE; and means for transmitting (e.g., to the network entity or a portion of the network entity, such as a CU, DU, RU, etc. for a base station having a disaggregated architecture), a CLI feedback information, wherein the CLI feedback information is indicative of CLI between the UE and one or more additional UEs included in the plurality of UEs. In some examples, the means for receiving can include controller/processor 280, transmit processor 264, TX MIMO processor 266, DEMODs 254a through 254r, antennas 252a through 252r, any combination thereof, or any other component(s) of the UE 104. In some examples, the means for generating can include controller/processor 280, memory 282, receive processor 258, transmit processor 264, any combination thereof, or any other component(s) of the UE 104. In some examples, the means for transmitting can include controller/ processor 280, transmit processor 264, TX MIMO processor 266, MODs 254a through 254r, antennas 252a through 252r, any combination thereof, or any other component(s) of the UE 104.

In some implementations, the base station 102 can include: means for receiving, at the UE, a crosslink interference (CLI) training session configuration from a network entity, wherein the CLI training session configuration is transmitted to a plurality of UEs including the UE; and transmitting, to the network entity, a CLI feedback information, wherein the CLI feedback information is indicative of CLI between the UE and one or more additional UEs included in the plurality of UEs. In some examples, the means for transmitting can include controller/processor 240, transmit processor 220, TX MIMO processor 230, MODs 234a through 234t, antennas 234a through 234t, any combination thereof, or any other component(s) of the base station 102. In some examples, the means for receiving can include controller/processor 240, transmit processor 220, TX MIMO processor 230, DEMODs 234a through 234t, antennas 234a through 234t, any combination thereof, or any other component(s) of the base station 102.

Figure 3:
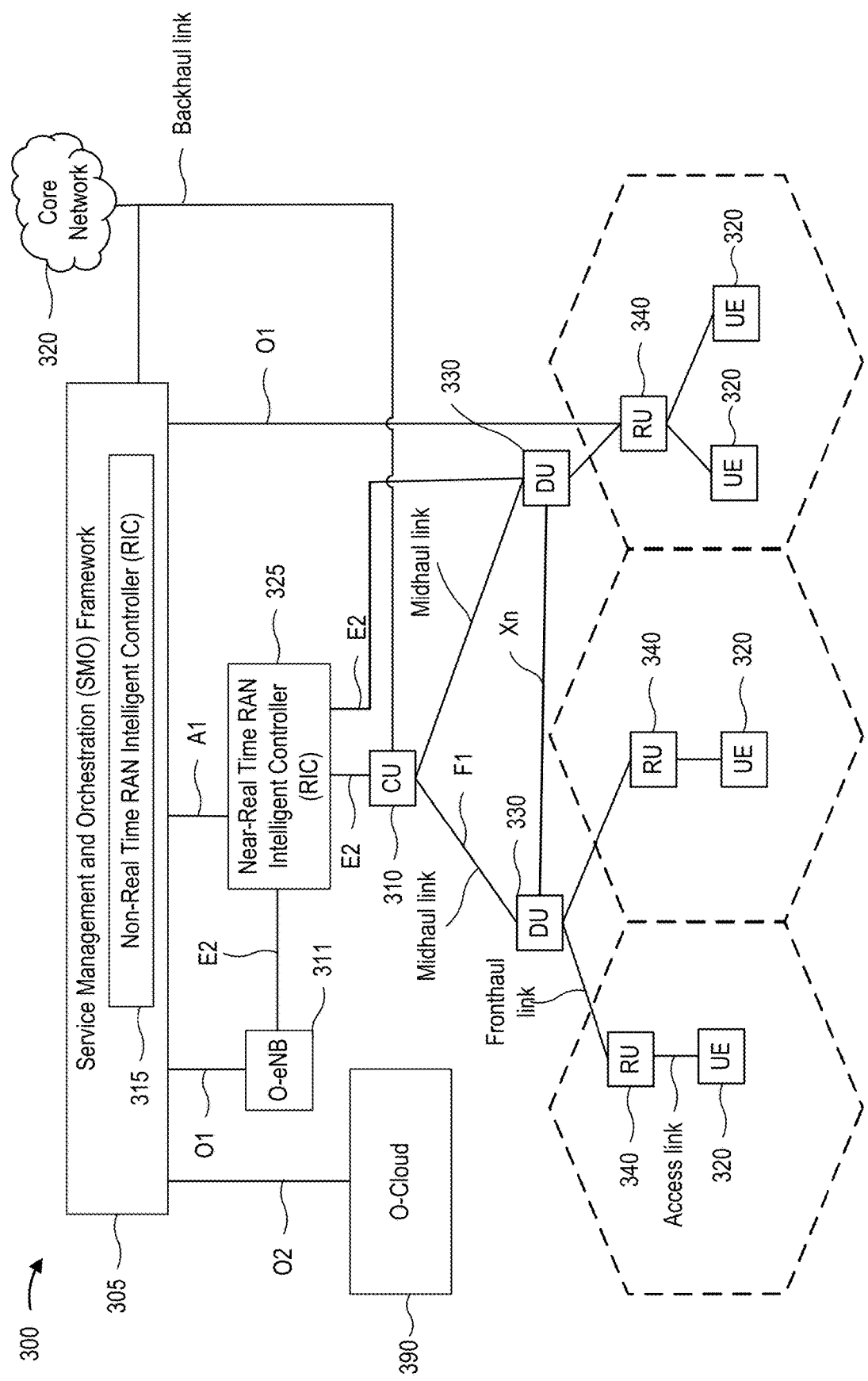
FIG. 3 is a diagram illustrating an example of a disaggregated base station architecture, in accordance with some examples.

FIG. 3 is a diagram illustrating an example of a disaggregated base station 300 architecture, which may be employed by the disclosed systems and techniques, in accordance with some examples. Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, AP, a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units (e.g., a virtual central unit (VCU), a virtual distributed unit (VDU), or a virtual radio unit (VRU)).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

As previously mentioned, FIG. 3 shows a diagram illustrating an example disaggregated base station 300 architecture. The disaggregated base station 300 architecture may include one or more central units (CUs) 310 that can communicate directly with a core network 320 via a backhaul link, or indirectly with the core network 320 through one or more disaggregated base station units (such as a Near-Real Time (Near-RT) RAN Intelligent Controller (RIC) 325 via an E2 link, or a Non-Real Time (Non-RT) RIC 315 associated with a Service Management and Orchestration (SMO) Framework 305, or both). A CU 310 may communicate with one or more distributed units (DUs) 330 via respective midhaul links, such as an F1 interface. The DUs 330 may communicate with one or more radio units (RUs) 340 via respective fronthaul links. The RUs 340 may communicate with respective UEs 320 via one or more RF access links. In some implementations, the UE 320 may be simultaneously served by multiple RUs 340.

Each of the units (e.g., the CUs 310, the DUs 330, the RUs 340, as well as the Near-RT RICs 325, the Non-RT RICs 315 and the SMO Framework 305) may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (e.g., Central Unit-User Plane (CU-UP)), control plane functionality (e.g., Central Unit-Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate bidirectionally with the DU 330 via an interface, such as the F1-C or F1-U interface (referred to collectively herein as "F1"), as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the $3^{rd}$ Generation Partnership Project (3GPP). In some aspects, the DU 330 may further host one or more low PHY layers. Each layer (or module) can be implemented with an interface configured to communicate signals with other layers (and modules) hosted by the DU 330, or with the control functions hosted by the CU 310. In some cases, DUs 330 can be implemented to communicate bidirectionally with other DUs 330 via an interface, such as the Xn interface, as necessary, for network control and signaling. In some implementations, DUs 330 can communicate bidirectionally with other DUs 330 via direct over the air (OTA) communication between the DUs.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle OTA communication with one or more UEs 320. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340 and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via O1) or via creation of RAN management policies (such as A1 policies).

Figure 4:
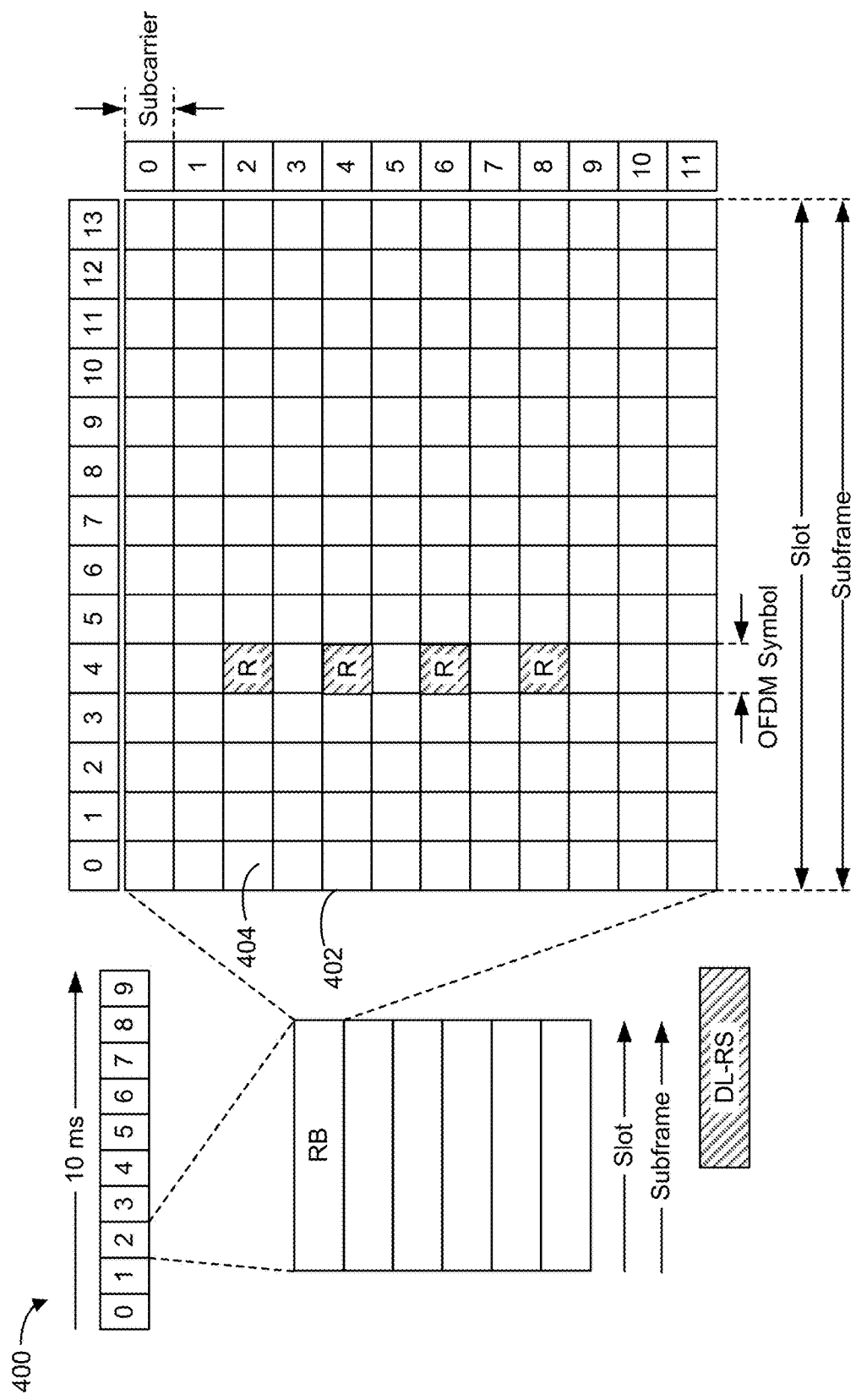
FIG. 4 is a diagram illustrating an example of a frame structure, which may be employed by the disclosed systems and techniques, in accordance with some examples.

Various radio frame structures may be used to support downlink, uplink, and sidelink transmissions between network nodes (e.g., base stations and UEs). FIG. 4 is a diagram 400 illustrating an example of a frame structure, which may be employed by the disclosed systems and techniques for CLI cancellation, according to some aspects of the disclosure. Other wireless communications technologies may have different frame structures and/or different channels.

NR (and LTE) utilizes OFDM on the downlink and single-carrier frequency division multiplexing (SC-FDM) on the uplink. Unlike LTE, however, NR has an option to use OFDM on the uplink as well. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (resource block) may be 12 subcarriers (or 180 kHz). Consequently, the nominal fast Fourier transform (FFT) size may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.08 MHz (e.g., 6 resource blocks), and there may be 1, 2, 4, 8, or 16 subbands for system bandwidth of 1.25, 2.5, 5, 10, or 20 MHz, respectively.

vLTE supports a single numerology (subcarrier spacing, symbol length, etc.). In contrast, NR may support multiple numerologies (O. For example, subcarrier spacing (SCS) of 15 kHz, 30 kHz, 60 kHz, 120 kHz, and 240 kHz or greater may be available. Table 1 provided below lists some various parameters for different NR numerologies.

resource block (RB) 402. The resource grid is further divided into multiple resource elements (REs). Referring to FIG. 4, the RB 402 includes multiple REs, including the resource element (RE) 404. The RE 404 may correspond to one symbol length in the time domain and one subcarrier in the frequency domain. In the numerology of FIG. 4, for a normal cyclic prefix, RB 402 may contain 12 consecutive subcarriers in the frequency domain and seven consecutive symbols in the time domain, for a total of 84 REs such as RE 404. For an extended cyclic prefix, an RB may contain 12 consecutive subcarriers in the frequency domain and six consecutive symbols in the time domain, for a total of 72 REs. The number of bits carried by each RE depends on the modulation scheme.

In some aspects, some REs can be used to transmit downlink reference (pilot) signals (DL-RS). The DL-RS can include Positioning Reference Signal (PRS), Tracking Reference Signal (TRS), Phase Tracking Reference Signal (PTRS), Channel State Information Reference Signal (CSI-RS), Demodulation Reference Signal (DM-RS), Primary Synchronization Signal (PSS), Secondary Synchronization Signal (SSS), etc. The resource grid if FIG. 4 illustrates exemplary locations of REs used to transmit DL-RS (labeled "R").

In some aspects, some of the REs carry DM-RS for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. In some implementations, the PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI. In some cases, the PUCCH can be periodic (P), semi-persistent (SP), aperiodic (AP), and/or any combination thereof.

TABLE 1

|   | SCS (kHz) | Symbols/ Sot | Slots/ Subframe | Slots/ Frame | Slot Duration (ms) | Symbol Duration (µs) | Max. nominal system BW (MHz) with 4K FFT size |
|---|---|---|---|---|---|---|---|
| 0 | 15 | 14 | 1 | 10 | 1 | 66.7 | 50 |
| 1 | 30 | 14 | 2 | 20 | 0.5 | 33.3 | 100 |
| 2 | 60 | 14 | 4 | 40 | 0.25 | 16.7 | 100 |
| 3 | 120 | 14 | 8 | 80 | 0.125 | 8.33 | 400 |
| 4 | 240 | 14 | 16 | 160 | 0.0625 | 4.17 | 800 |

In one example, a numerology of 15 kHz is used. Thus, in the time domain, a 10 millisecond (ms) frame is divided into 10 equally sized subframes of 1 ms each, and each subframe includes one time slot. In FIG. 4, time is represented horizontally (e.g., on the X axis) with time increasing from left to right, while frequency is represented vertically (e.g., on the Y axis) with frequency increasing (or decreasing) from bottom to top.

A resource grid may be used to represent time slots, each time slot including one or more time-concurrent resource blocks (RBs) (also referred to as physical RBs (PRBs)) in the frequency domain. FIG. 4 illustrates an example of a In some cases, the UE may transmit sounding reference signals (SRS). In some implementations, the SRS may be transmitted in the last symbol of a subframe. In some cases, the SRS may have a comb structure, and a UE may transmit SRS on one of the combs. The SRS may be used by a base station for channel quality estimation to enable frequency-dependent scheduling on the UL. In some implementations, the SRS can be P, SP, AP, and/or any combination thereof.

In some aspects, one or more resources in the resource grid can be used to perform sidelink communications. For example, sidelink communications can be implemented using a mode (e.g., mode 1) in which a base station (e.g., base station 102 of FIG. 1) can designate/select one or more resources (e.g., resource elements (e.g., RE 404), resource blocks (e.g., RB 402), subcarriers, symbols, frames, sub-frames, etc.) for sidelink communications. In another example, sidelink communications can be implemented using a mode (e.g., mode 2) in which a UE (e.g., UE 104 of FIG. 1) can designate/select one or more resources (e.g., resource elements (e.g., RE 404), resource blocks (e.g., RB 402), subcarriers, symbols, frames, sub-frames, etc.) for sidelink communications. In some aspects, resource allocation for sidelink communications can correspond to one or more subchannels in the frequency domain and one or more slots in the time domain. In some cases, a subchannel may include from 10 RBs to 100 RBs. In some examples, a sidelink slot may include 7-14 OFDM symbols.

In some examples, a UE (e.g., UE 104 of FIG. 1) can be configured to receive a sidelink packet by performing blind decoding of all sidelink subchannels. In some aspects, the sidelink UE can decode a Physical Sidelink Control Channel (PSCCH) in a configured sidelink resource pool. In some cases, the PSCCH can be used to carry sidelink control information (SCI) which contains information about the resource allocation on the Physical Sidelink Shared Channel (PSSCH). For example, a first stage SCI can be transmitted in PSCCH and may include information regarding the PSSCH bandwidth as well as resource reservations in future slots. In some cases, a second stage SCI can be located and decoded after decoding PSCCH. In some aspects, a source identifier and/or a destination identifier can be used to determine a source and/or destination UE associated with a packet. In some examples, the UE can proceed with decoding PSSCH if PSCCH (e.g., SCI) indicates a receiver ID matching the UE's ID. In some configurations, PSCCH and PSSCH can be transmitted using the same slot.

In some examples, PSCCH may be configured to occupy or use multiple RBs in a single subchannel. In some aspects, a subchannel can occupy multiple PRBs (e.g., a subchannel can occupy 10, 15, 20, 25, 50, 75, 100 PRBs). In some cases, PSCCH may be configured to occupy 10, 12, 15, 20, or 25 PRBs in a subchannel. In some aspects, PSCCH may be limited to one subchannel. In some cases, the duration of PSCCH can be configured use 2 or 3 symbols. In some aspects, a resource pool (RP) can include any number of subchannels (e.g., a RP can include 1-27 subchannels). In some cases, the size of PSCCH may be fixed for a RP (e.g., size can correspond to 10% to 100% of a subchannel). In some examples, PSSCH may occupy 1 or more subchannels and may include a second stage SCI.

FIG. 5 is a diagram illustrating an example of a slot format table 500. In one or more examples, the slot format (e.g., as designated in a slot format table 500) may provide a network entity (e.g., a UE) with the required downlink and/or uplink transmission pattern. In some examples of the disclosed system, the slot format may provide the network entity an indication of an allocation of some of its resources (e.g., allocating RF sensing resources for communications purposes).

In one or more examples, a slot can be utilized as a dynamic scheduling unit (e.g., for communications and/or for RF sensing). The number of OFDM symbols per slot is typically fixed (e.g., as in NR). For example, when the cyclic prefixes (CPs) of an OFDM waveform have a normal duration, there are typically a total of fourteen OFDM symbols. In another example, when the CPs of an OFDM waveform have an extended duration, there are typically a total of twelve slots. The example slot format table 500 in FIG. 5 shows a total of fourteen OFDM symbols per slot.

In some cases, a slot may be classified as downlink, where all of the symbols of the slot are dedicated for the downlink transmissions. In some cases, a slot may be classified as uplink, where all of the symbols of the slot are dedicated for uplink transmissions. In the case of half duplex frequency division duplexing (FDD), all symbols within a slot for a downlink carrier are used for downlink transmissions, and all symbols within a slot for an uplink carrier are used for uplink transmissions.

However, in the case of time division duplexing (TDD) (e.g., as is shown in the slot format table 500 of FIG. 5), it is possible for a slot to be configured to be used for a mix of uplink and downlink transmissions. When using a mix of uplink and downlink transmissions for a slot, a guard period may be necessary for the transceiver switching from the downlink to the uplink, and to allow for a timing advance in the uplink.

NR TDD utilizes a flexible slot configuration (e.g., which is shown in the slot format table 500 of FIG. 5). For this configuration, OFDM symbols of a slot can be designated as "downlink" (e.g., represented by a "D" letter) for downlink transmissions, "uplink" (e.g., representing by a "U" letter) for uplink transmissions, or "flexible" (e.g., represented by an "F" letter). The flexible symbol "F" can be configured for either uplink or downlink transmissions. One of the intentions of introducing the flexible symbols within the slots is to handle the required guard period. It should be noted that if a slot format is not provided by the network (e.g., a network entity), all of the OFDM symbols are considered to be "flexible" as a default.

NR supports the slot format configuration in static, semi-static, or dynamic fashion. The static slot configuration and the semi-static slot configuration are executed using RRC, while the dynamic slot configuration is executed using physical downlink control channel (PDCCH) DCI. In TDD, for small and/or isolated cells, dynamic TDD may be more suitable to adapt to variations in traffic. For large cells, the semi-static TDD may be more suitable for handling interference issues.

Figure 6:
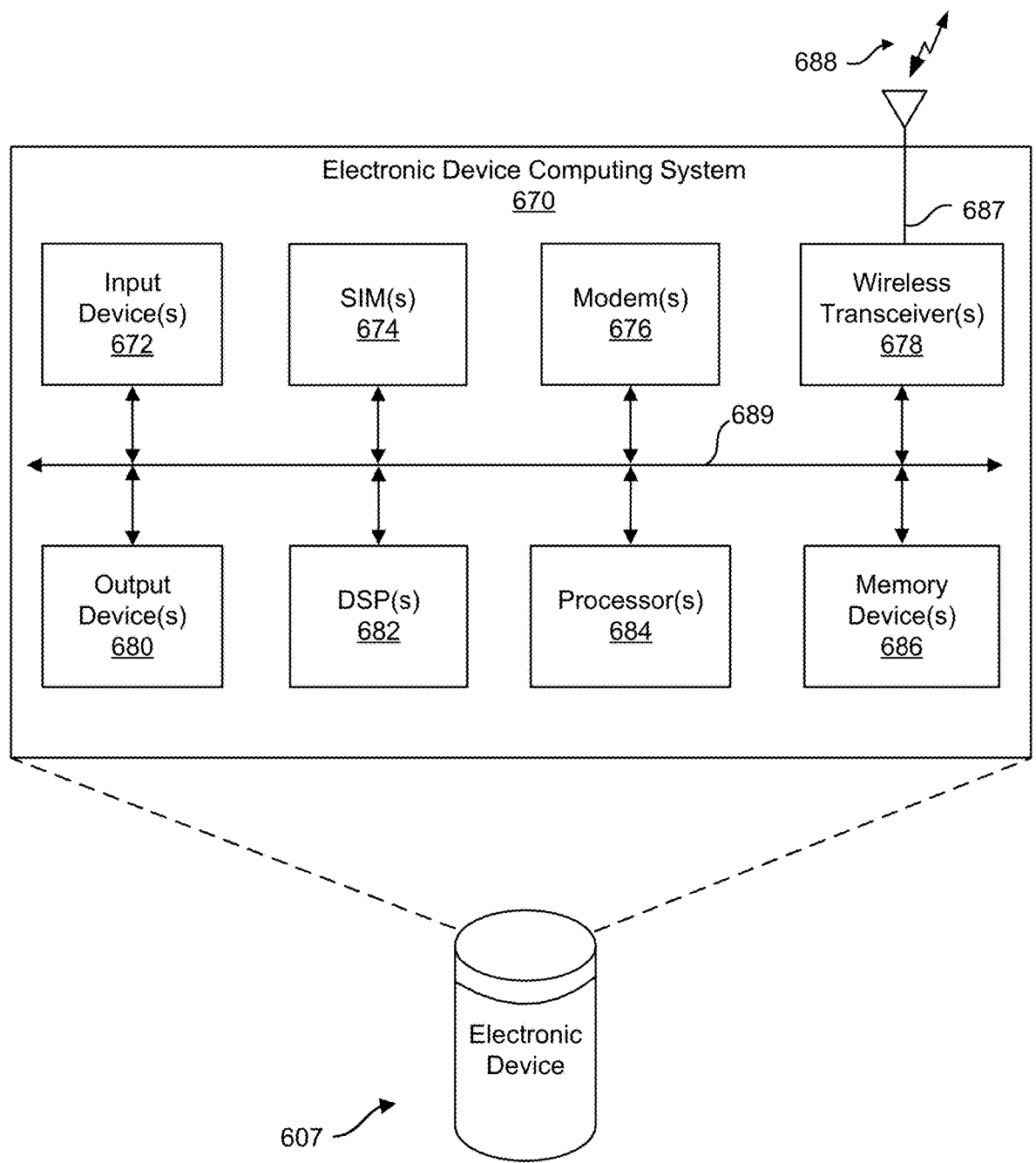
FIG. 6 is a block diagram illustrating an example of a computing system of an electronic device that may be employed by the disclosed systems and techniques, in accordance with some examples.

FIG. 6 is a block diagram illustrating an example of a computing system 670 of an electronic device 607 that may be employed by the disclosed systems and techniques, in accordance with some examples. The electronic device 607 is an example of a device that can include hardware and software for the purpose of connecting and exchanging data with other devices and systems using a communications network (e.g., a 3GPP network, such as a 5G/NR network, a 4G/LTE network, a WiFi network, or other communications network). For example, the electronic device 607 can include, or be a part of, a mobile device (e.g., a mobile telephone), a wearable device (e.g., a network-connected or smart watch), an extended reality device (e.g., a VR device, an AR device, or a MR device), a personal computer, a laptop computer, a tablet computer, an IoT device, a wireless access point, a router, a vehicle or component of a vehicle, a server computer, a robotics device, and/or other device used by a user to communicate over a wireless communications network. In some cases, the device 607 can be referred to as UE, such as when referring to a device configured to communicate using 5G/NR, 4G/LTE, or other telecommunication standard. In some cases, the device can be referred to as a station (STA), such as when referring to a device configured to communicate using the Wi-Fi standard.

The computing system 670 includes software and hardware components that can be electrically or communicatively coupled via a bus 689 (or may otherwise be in communication, as appropriate). For example, the computing system 670 includes one or more processors 684. The one or more processors 684 can include one or more CPUs, ASICs, FPGAs, APs, GPUs, VPUs, NSPs, microcontrollers, dedicated hardware, any combination thereof, and/or other processing device/s and/or system/s. The bus 689 can be used by the one or more processors 684 to communicate between cores and/or with the one or more memory devices 686.

The computing system 670 may also include one or more memory devices 686, one or more digital signal processors (DSPs) 682, one or more subscriber identity modules (SIMs) 674, one or more modems 676, one or more wireless transceivers 678, one or more antennas 687, one or more input devices 672 (e.g., a camera, a mouse, a keyboard, a touch sensitive screen, a touch pad, a keypad, a microphone or a microphone array, and/or the like), and one or more output devices 680 (e.g., a display, a speaker, a printer, and/or the like).

The one or more wireless transceivers 678 can receive wireless signals (e.g., signal 688) via antenna 687 from one or more other devices, such as other user devices, network devices (e.g., base stations such as evolved Node Bs (eNBs) and/or gNodeBs (gNBs), WiFi access points (APs) such as routers, range extenders or the like, etc.), cloud networks, and/or the like. In some examples, the computing system 670 can include multiple antennas or an antenna array that can facilitate simultaneous transmit and receive functionality. Antenna 687 can be an omnidirectional antenna such that RF signals can be received from and transmitted in all directions. The wireless signal 688 may be transmitted via a wireless network. The wireless network may be any wireless network, such as a cellular or telecommunications network (e.g., 3G, 4G, 5G, etc.), wireless local area network (e.g., a WiFi network), a Bluetooth™ network, and/or other network. In some examples, the one or more wireless transceivers 678 may include an RF front end including one or more components, such as an amplifier, a mixer (also referred to as a signal multiplier) for signal down conversion, a frequency synthesizer (also referred to as an oscillator) that provides signals to the mixer, a baseband filter, an analog-to-digital converter (ADC), one or more power amplifiers, among other components. The RF front-end can generally handle selection and conversion of the wireless signals 688 into a baseband or intermediate frequency and can convert the RF signals to the digital domain.

In some aspects, the one or more wireless transceivers 678 can perform alternating transmit and receive functions (e.g., performing a half-duplex operation). For example, the one or more wireless transceivers 678 can alternately enable an RF transmitter to transmit an uplink Tx signal when the one or more wireless transceivers 678 are not enabled to receive (e.g., not receiving), and enable an RF receiver to receive a downlink Rx signal when the one or more wireless transceivers 678 are not enabled to transmit (e.g., not transmitting).

In other aspects, the one or more wireless transceivers 678 can perform concurrent transmit and receive functions (e.g., performing a sub-band or full-band full-duplex operation). For example, wire the one or more wireless transceivers 678 can enable an RF receiver to receive at or near the same time as it enables an RF transmitter to transmit.

In some cases, the computing system 670 can include a coding-decoding device (or CODEC) configured to encode and/or decode data transmitted and/or received using the one or more wireless transceivers 678. In some cases, the computing system 670 can include an encryption-decryption device or component configured to encrypt and/or decrypt data (e.g., according to the Advanced Encryption Standard (AES) and/or Data Encryption Standard (DES) standard) transmitted and/or received by the one or more wireless transceivers 678.

The one or more SIMs 674 can each securely store an international mobile subscriber identity (IMSI) number and related key assigned to the user of the electronic device 607. The IMSI and key can be used to identify and authenticate the subscriber when accessing a network provided by a network service provider or operator associated with the one or more SIMs 674. The one or more modems 676 can modulate one or more signals to encode information for transmission using the one or more wireless transceivers 678. The one or more modems 676 can also demodulate signals received by the one or more wireless transceivers 678 to decode the transmitted information. In some examples, the one or more modems 676 can include a WiFi modem, a 4G (or LTE) modem, a 5G (or NR) modem, and/or other types of modems. The one or more modems 676 and the one or more wireless transceivers 678 can be used for communicating data for the one or more SIMs 674.

The computing system 670 can also include (and/or be in communication with) one or more non-transitory machine-readable storage media or storage devices (e.g., one or more memory devices 686), which can include, without limitation, local and/or network accessible storage, a disk drive, a drive array, an optical storage device, a solid-state storage device such as a RAM and/or a ROM, which can be programmable, flash-updateable and/or the like. Such storage devices may be configured to implement any appropriate data storage, including without limitation, various file systems, database structures, and/or the like.

In various aspects, functions may be stored as one or more computer-program products (e.g., instructions or code) in memory device(s) 686 and executed by the one or more processor(s) 684 and/or the one or more DSPs 682. The computing system 670 can also include software elements (e.g., located within the one or more memory devices 686), including, for example, an operating system, device drivers, executable libraries, and/or other code, such as one or more application programs, which may comprise computer programs implementing the functions provided by various embodiments, and/or may be designed to implement methods and/or configure systems, as described herein.

In some aspects, the electronic device 607 can include means for performing operations described herein. The means can include one or more of the components of the computing system 670. For example, the means for performing operations described herein may include one or more of input device(s) 672, SIM(s) 674, modems(s) 676, wireless transceiver(s) 678, output device(s) 680, DSP(s) 682, processors 684, memory device(s) 686, and/or antenna(s) 687.

In some aspects, the electronic device 607 can include means for receiving, at the electronic device 607, a crosslink interference (CLI) training session configuration from a network entity, wherein the CLI training session configuration is transmitted to a plurality of electronic devices including the electronic device 607; and transmitting, to the network entity, a CLI feedback information, wherein the CLI feedback information is indicative of CLI between the electronic device 607 and one or more additional electronic devices included in the plurality of electronic devices. In some examples, any or all of these means can include the one or more wireless transceivers 678, the one or more modems 676, the one or more processors 684, the one or more DSPs 682, the one or more memory devices 686, any combination thereof, or other component(s) of the electronic device 607.

As noted previously, some communication modes (e.g., time division duplexing (TDD), FD, etc.) may cause an overlap in conflicting communications, such as between transmissions and/or receptions to and from UEs. One example of interference between an uplink transmission by a first UE (an aggressor UE) and a downlink reception by a second UE (a victim UE) is referred to as cross-link interference (CLI).

Figure 7:
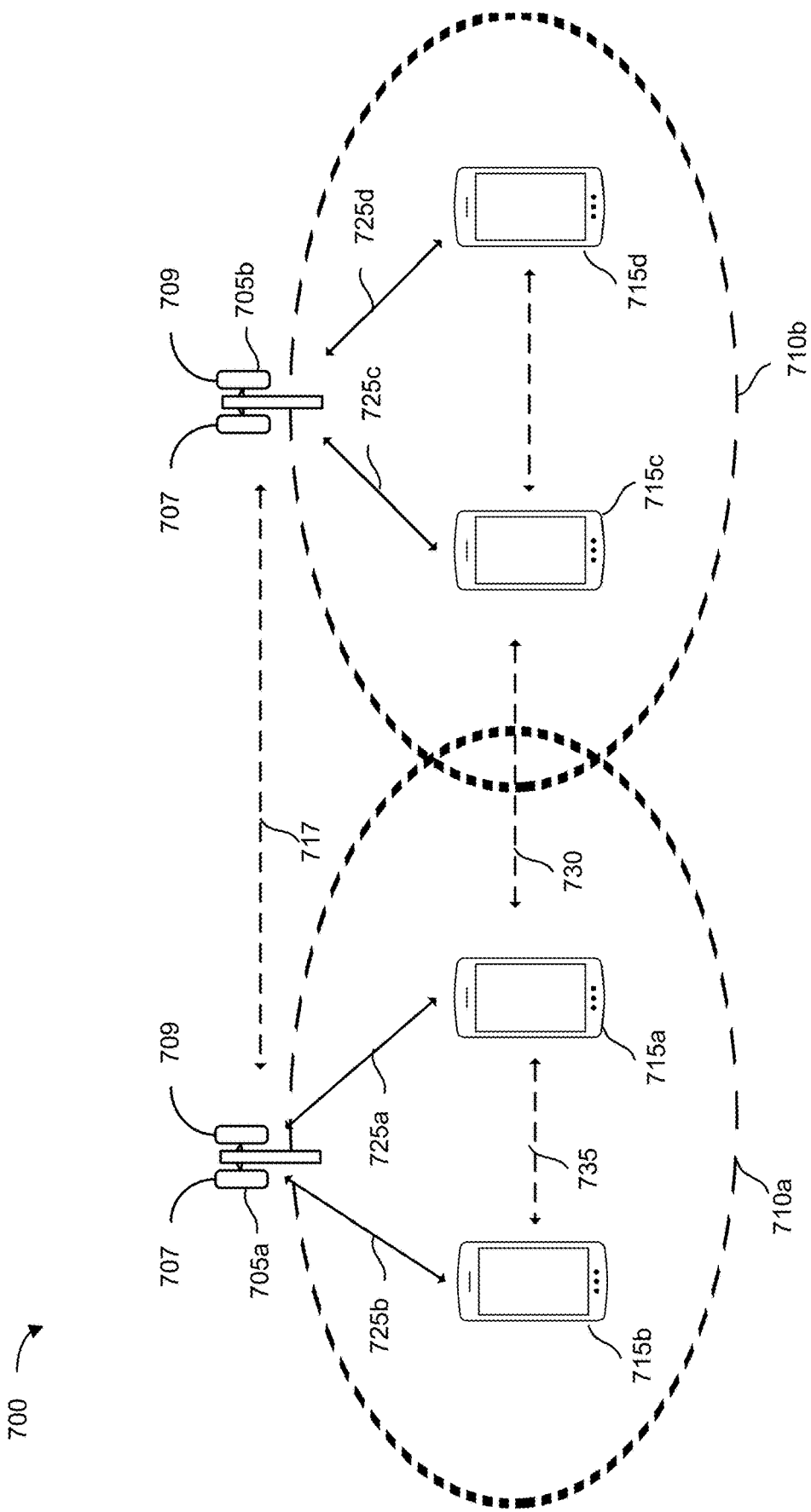
FIG. 7 is a diagram depicting an example of the occurrence of crosslink interference (CLI) in a system, in accordance with some examples.

FIG. 7 is a diagram depicting an example of the occurrence of CLI in a system 700. The system 700 of FIG. 7 may include UEs 715a, 715b, 715c, 715d (e.g., UEs 104 of FIG. 1), base stations (e.g., gNBs) 705a, 705b. The UE 715a (also referred to herein as UE1), UE 715b (also referred to herein as UE2) and the base station 705a may be located within a first cell 710a (also referred to herein as cell 1). In some aspects, the UE 715c (also referred to herein as UE3), UE 715d (also referred to herein as UE4) and the base station 705b may be located within a second cell 710b (also referred to herein as cell 2). As illustrated, the base stations 705a, 705b can include multiple transceivers 707, 709 that can operate simultaneously (e.g., in a MIMO configuration).

In some cases, different transceivers 707, 709 of a single base station 705a, 705b, may experience self-interference. For example, transceiver 707 of base station 705a may be configured to transmit a UL transmission (e.g., signal 725b) to UE2 715b while transceiver 709 of base station 705b is configured to receive a DL transmission from UE1 715a (e.g., signal 725a). In some cases, the UL transmission from transceiver 707 can reflect from one or more objects and the transceiver 709 can receive the reflected signal. In some cases, the interference between transceivers of a base station can be referred to as self-interference (SI), clutter, or the like.

Figure 8:
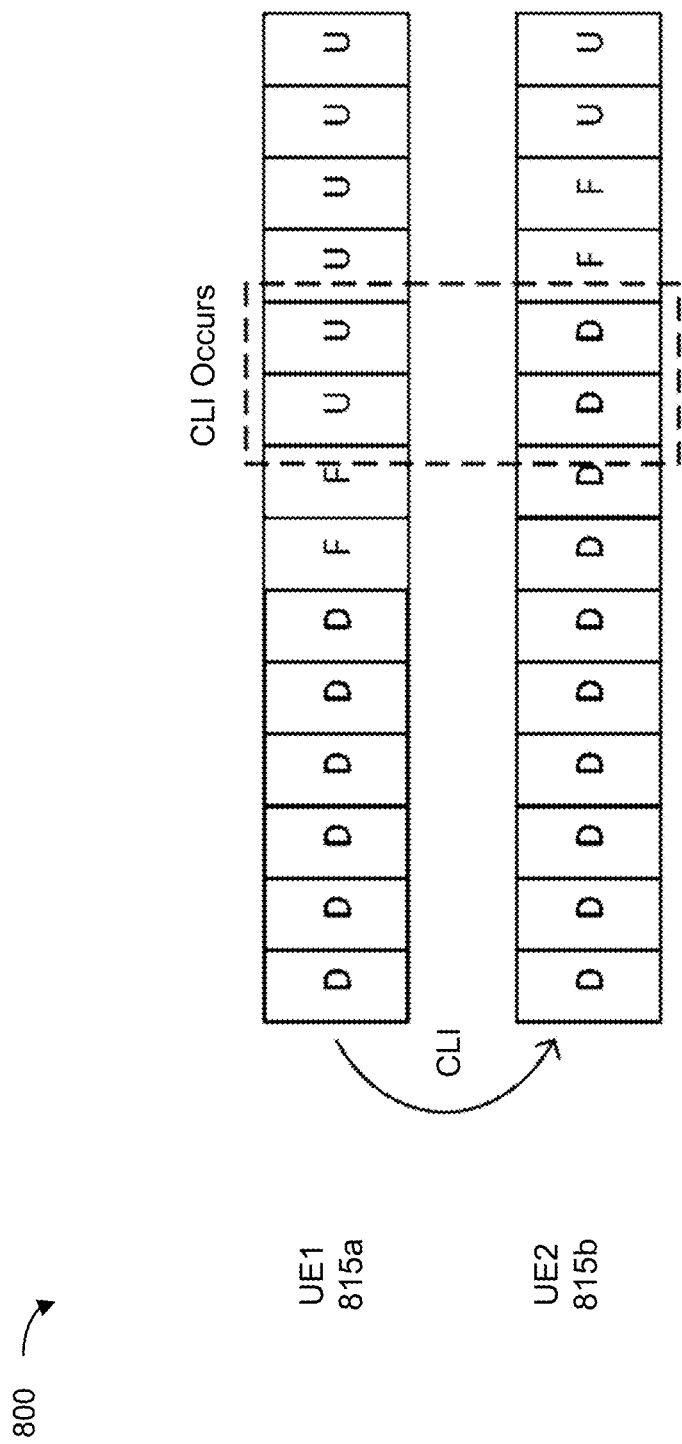
FIG. 8 is a diagram illustrating an example time-division duplexing (TDD) communication configuration, in accordance with some examples.

FIG. 8 is a diagram illustrating example TDD configurations 800 (e.g., including TDD configuration 815a and TDD configuration 815b) for the system 700 of FIG. 7, in accordance with some examples. Each of the cells 710a, 710b of FIG. 7 may have a different TDD configuration 815a, 815b. For example, the first cell 710a may have a first TDD configuration 815a, and the second cell 710b may have a second TDD configuration 815b. The network devices (e.g., UEs 715a, 715b, 715c, 715d and base stations 705a, 705b) may communicate using their TDD configuration associated with their particular cell. For example, the UE 715a (e.g., UE1) and the base station 705a located within the first cell 710a (e.g., cell 1) may communicate using the first TDD configuration 815a. In addition, the UE 715b (e.g., UE2) and the base station 705a located within the first cell 710a may communicate using the first TDD configuration 815a. For example, UE1 may communicate with first transceiver 707 of base station 705a and UE2 may communicate with second transceiver 709 of base station 705a. In some cases, the UE 715c (e.g., UE3) and the base station 705b located within the second cell 710b (e.g., cell 2) may communicate using the second TDD configuration 815b. In some examples, the UE 715d (e.g., UE4) and the base station 705b located within the second cell 710b may communicate using the second TDD configuration 815b. For example, UE3 may communicate with first transceiver 707 of base station 705b and UE4 communicate with second transceiver 709 of base station 705b.

Each TDD configuration 815a, 815b may include a plurality of symbols (e.g., OFDM symbols of FIG. 4). The symbols of a slot (e.g., slot of FIG. 4) may be designated as "downlink" (e.g., represented by a "D" letter) for downlink transmissions, "uplink" (e.g., represented by a "U" letter) for uplink transmissions, "flexible" (e.g., represented by an "F" letter), and/or "sensing" (e.g., represented by an "SRS" for sounding reference signal). The flexible symbol "F" can be configured for either uplink or downlink transmissions. The flexible symbol "F" can be utilized as a guard period between the uplink transmissions and the downlink transmissions to prevent inter-symbol interference and/or to provide time for a UE to adjust its RF hardware.

Each of the base stations 705a, 705b may transmit a downlink signal (e.g., signals 725a, 725b, 725c, 725d) on a downlink symbol (e.g., "D" symbol). In some cases, each of the UEs 715a, 715b, 715c, 715d may transmit an uplink signal (e.g., signals 725a, 725b, 725c, 725d) on an uplink symbol (e.g., "U" symbol). Each of the UEs 715a, 715b, 715c, 715d, may transmit a sensing signal (e.g., an SRS) in an uplink transmission on a sensing symbol (e.g., "SRS" symbol).

In some cases, neighboring cells with different TDD configurations may lead to conflicting (overlapping) transmissions for some symbols of a slot. The TDD configurations 800 of FIG. 8, for example, exhibit conflicting transmissions in the ninth and tenth slots of TDD configuration 815a and TDD configuration 815b. In particular, for these two specific slots (e.g., the ninth and tenth slots), a UL transmission (e.g., denoted by the letter "U") and a DL transmission (e.g., denoted by the letter "D") are configured to occur at the same frequency at the same time for these two adjacent cells 710a, 710b. For example, UE 715c in cell 710b may be configured to transmit a UL transmission (e.g., signal 725c) at the same time UE 715a in cell 710a may be configured to receive a DL transmission (e.g., signal 725a). Since these UEs 715a, 715c are nearby each other in neighboring cells 710a, 710b, the UL transmission of UE 715c may cause an interference in the DL reception of UE 715a. This type of interference is referred to as CLI and, in particular, as inter-cell UE-to-UE CLI (e.g., which is denoted by link 730 of FIG. 7). The UE 715c transmitting the UL signal may be referred to as the "aggressor UE," and the UE 715a receiving the affected DL transmission (e.g., containing interference) may be referred to as the "victim UE." The CLI is transparent to the aggressor UE (e.g., UE 715c). In another illustrative example, UE 715b in cell 710a may be configured to transmit a UL transmission (e.g., signal 725b) at the same time UE 715a in cell 710a may be configured to receive a DL transmission (e.g., signal 725a). In some cases, the UE transmission of UE 715b may cause an interference in the DL reception of UE 715a. This type of interference is referred to as intra-cell UE-to-UE CLI (e.g., which is denoted by link 735 of FIG. 7). It should be noted that CLI in the system 700 may occur on additional links (e.g., links 717, 735) other than on link 730.

In addition, in some cases, different transceivers 707, 709 of a single base station 705a, 705b, may experience self-interference. For example, transceiver 707 of base station 705a may be configured to transmit a DL transmission (e.g., signal 725b) to UE2 715b while transceiver 709 of base station 705b is configured to receive a UL transmission from UE1 715a (e.g., signal 725a). In some cases, the DL transmission from transceiver 707 can reflect from one or more objects and the transceiver 709 can receive the reflected signal which can interfere with the UL transmission from UE1 715a. In some cases, the interference between transceivers of a base station can be referred to as self-interference, clutter, or the like.

In some examples, one or more of the base stations (e.g., gNBs) 705a, 705b can utilize a full duplex (FD) mode or configuration and/or one or more of the UEs 715a, 715b, 715c, 715d (e.g., UEs 104 of FIG. 1) can utilize a full duplex mode or configuration. For example, a full duplex mode or configuration can include in-band full duplex (IBFD) and/or can include sub-band full duplex (SBFD).

Figures 9A, 9B:
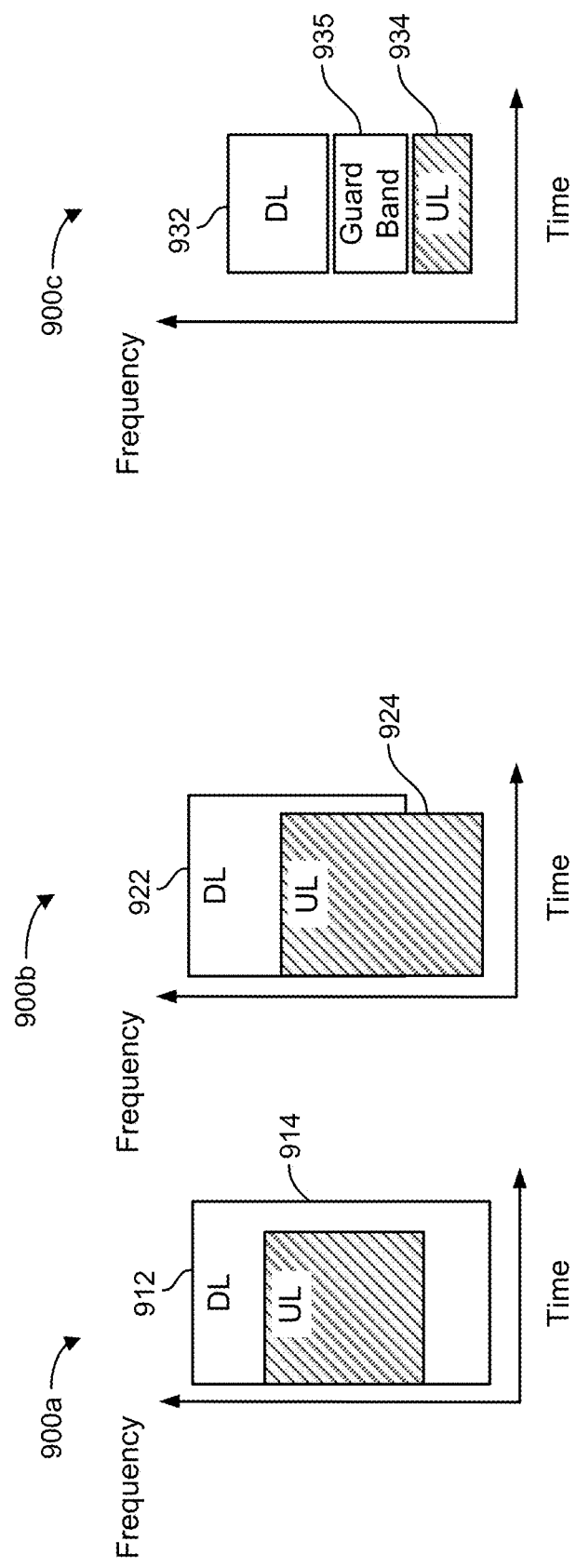
FIG. 9A is a diagram illustrating examples of an in-band full duplex (IBFD) communication configuration, in accordance with some examples.
FIG. 9B is a diagram a diagram illustrating an example of a sub-band full duplex (SBFD) communication configuration, in accordance with some examples.

FIG. 9A is a diagram illustrating examples of an IBFD communication configuration, in which a device (e.g., base station, gNB, UE, etc.) transmits and receives on the same time and frequency resource. For example, a downlink (DL) transmission and an uplink (UL) transmission can share the same time and frequency resource (e.g., the DL and UL transmissions occur at the same or overlapping time(s) and use the same or overlapping frequency resource(s)). In some examples, an IBFD communication configuration 900a can include a DL transmission 912 and a UL transmission 914 that are fully overlapping. In some examples, an IBFD communication configuration 900b can include a DL transmission 922 and a UL transmission 924 that are partially overlapping.

FIG. 9B is a diagram illustrating an example of an SBFD communication configuration 900c. In some aspects, SBFD may also be referred to as "flexible duplex." In an SBFD communication configuration, a device (e.g., base station, gNB, UE, etc.) may transmit and receive at the same time but using different frequency resources for transmitting (e.g., UL) and receiving (e.g., DL). For example, the SBFD communication configuration 900c includes a DL transmission 932 and a UL transmission 934 that can be received and transmitted, respectively, at the same time but are associated with different frequency resources. In some examples, an SBFD communication configuration (e.g., such as SBFD communication configuration 900c) can include a guard band 935 that separates the DL resource (e.g., DL transmission 932) from the UL resource (e.g., UL transmission 934) in the frequency domain.

FIGS. 10A and 10B are diagrams illustrating an example sub-band full duplex (SBFD) configuration. FIG. 10A illustrates an example of a carrier component (CC) 1002 including frequency sub-bands that can be allocated to allow for simultaneous DL traffic and UL traffic. In the illustrated example of FIG. 10A, the first OFDM symbol of the slot 1004 allocates the full bandwidth of the CC 1002 for DL. In the example sub-band configuration of FIG. 10A, the bandwidth of the channel carrier 1002 is divided into two DL sub-bands (indicated by the D symbol) and a UL sub-band (indicated by the U symbol) between the DL sub-bands for the second and subsequent OFDM symbols of the slot 1004. In one illustrative example, the DL sub-bands can be allocated to a first UE (e.g., UE 715a) and the UL sub-band can be allocated to a second UE (e.g., UE 715b) within a cell (e.g., associated with the base station 705a). In the sub-band configuration shown in FIG. 10A, the base station 705a can transmit a DL transmission to the first UE while the second UE transmits a UL transmission to the base station 705a. The UL transmission by the second UE can interfere with the DL transmission to the first UE resulting in intra-sub-band CLI.

FIG. 10B illustrates an additional sub-band configuration. In the illustrated example of FIG. 10B, the first OFDM symbol of the slot 1014 allocates the full bandwidth of the CC 1012 for DL. In the example of FIG. 10B, the CC 1012 includes a DL sub-band (indicated by the D symbol) and a UL sub-band (indicated by the U symbol) for the second and subsequent OFDM symbols of the slot 1014. In one illustrative example, the UL sub-band can be allocated to a third UE (e.g., UE 715c) and the DL sub-band can be allocated to a fourth UE (e.g., UE 715d). The UL transmission by the third UE can interfere with the DL transmission to the fourth UE resulting in intra-sub-band CLI.

The example sub-band configurations of FIG. 10A and FIG. 10B are provided for the purposes of illustration, and other sub-band configurations can be used without departing from the scope of the present disclosure. For example, a sub-band configuration that does not include a full bandwidth DL allocation can be used without departing from the scope of the present disclosure. In some cases, different portions of the CC bandwidth can be allocated to DL or UL, including contiguous or non-contiguous DL and/or UL sub-bands.

In some aspects, the use of a full duplex mode or configuration can be associated with increased CLI, including increased CLI between UEs and/or increased CLI between base stations or gNBs. For example, when a UE is operating in half-duplex mode and communicating with a base station (e.g., gNB) that is operating in full-duplex mode (e.g., SBFD or IBFD), multiple sources of CLI may be present at the UE.

For example, referring again to FIG. 7, UE 715b may utilize a half-duplex mode to communicate with base station (e.g., gNB) 705a, which may utilize a full-duplex mode (e.g., SBFD or IBFD). UE 715b may experience inter-cell interference from base station 705b. For example, one or more transmissions from base station 705b (e.g., transmissions 725c and/or 725d, from base station 705b to UEs 715c and 715d, respectively) may interfere with the ability of UE 705b to receive a DL transmission 725b from base station 705a. Such interference may be referred to as inter-cell interference from other base stations or gNBs.

In some examples, UE 715b may experience intra-cell CLI interference from one or more UEs located in the same cell as UE 715b. For example, UE 715b can experience CLI 735 associated with UE 715a (e.g., located in the same cell 710a as UE 715b) transmitting a UL transmission 725a at the same time UE 715b receives a DL transmission 725b.

In some examples, UE 715b may experience inter-cell CLI from one or more UEs located in a different cell from UE 715b. In some aspects, the different cell may be an adjacent or nearby cell. For example, UE 715b can experience CLI associated with one or more of the UEs 715c and/or 715d located in the adjacent cell 710b. If UE 715b is receiving a DL transmission 725b from base station 725b, UE 715b may experience inter-cell CLI based on UE 715c transmitting UL transmission 725c to base station 705b and/or may experience inter-cell CLI based on UE 715d transmitting UL transmission 725d to base station 705b. In some cases, inter-cell CLI experienced by UE 715b can be the same as or similar to the inter-cell CLI 730 experienced by UE 715a (e.g., located in the same cell as UE 715b), as was described previously above.

In some aspects, when a UE (e.g., UE 715b) is a full-duplex UE (e.g., utilizes a full-duplex mode or configuration, such as SBFD or IBFD), the UE may additionally experience self-interference (SI). For example, a full-duplex UE may experience SI based on the full-duplex UE simultaneously transmitting a UL transmission and receiving a DL transmission.

Figure 11:
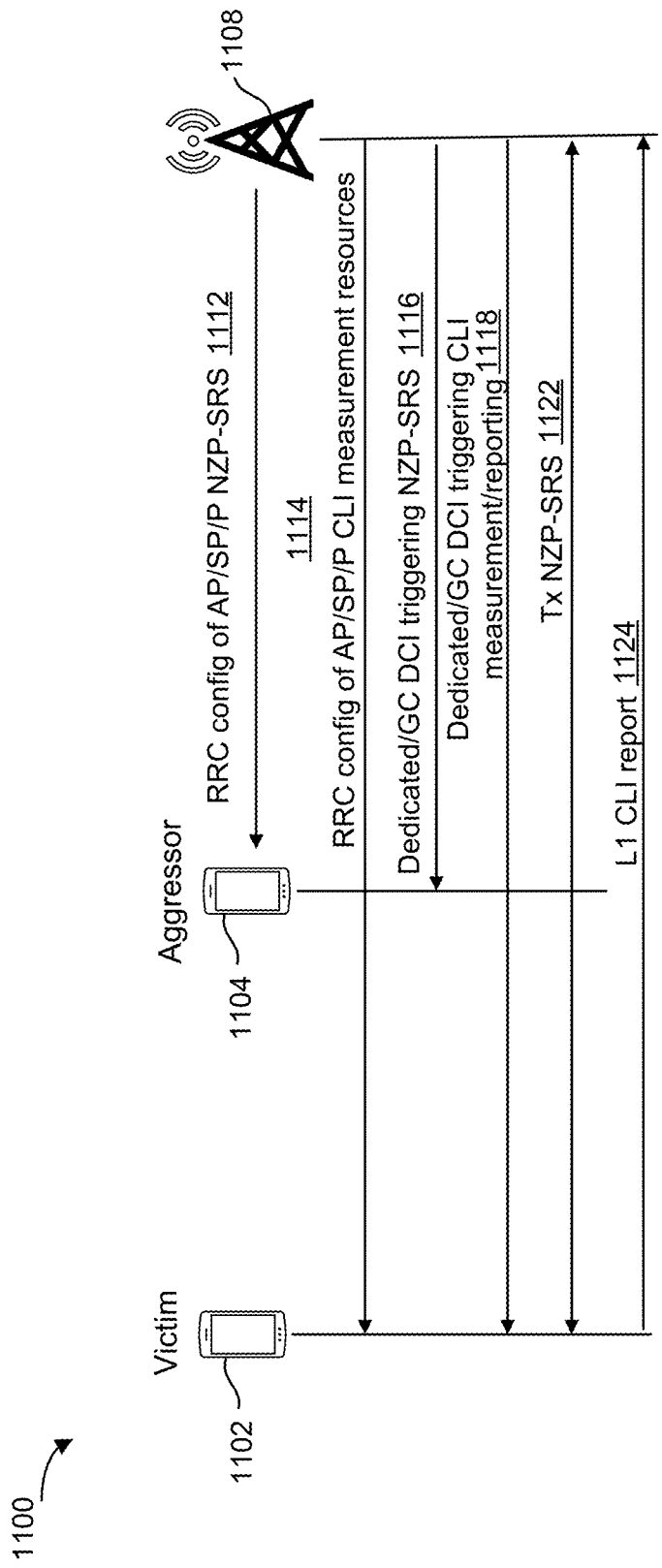
FIG. 11 is a diagram illustrating an example L1 crosslink interference (CLI) framework, in accordance with some examples.

FIG. 11 is a diagram illustrating an example L1 CLI framework 1100, in accordance with some examples. L1 CLI framework 1100 can be used to improve network flexibility and/or an ability of a network to adapt to dynamic or changing CLI. In some cases, the use of L1 CLI framework 1100 can be associated with an increase in control signaling overhead (e.g., on the L1 interface).

L1 CLI framework 1100 can be used to provide signaling between a base station (e.g., gNB) 1108, one or more aggressor UEs (e.g., aggressor UE 1104), and one or more victim UEs (e.g., victim UE 1102). A given UE may be considered both a victim UE and an aggressor UE. For example, when the given UE experiences CLI from one or more additional UEs, the given UE can be considered a victim UE. When the given UE causes CLI for one or more additional UEs, the given UE can be considered an aggressor UE.

In one illustrative example, the L1 CLI framework 1100 can be used to trigger L1 CLI measurement and reporting using a dedicated DCI or a group-common DCI. In some aspects, a CLI transmission resource (e.g., a CLI Tx resource) can be configured based on the base station 1108 configuring an aggressor UE 1104 with aperiodic (AP), semi-periodic (SP), and/or periodic (P) non-zero power (NZP) SRS resources. For example, base station 1108 can transmit or provide aggressor UE 1104 with an RRC configuration of AP/SP/P NZP-SRS 1112.

Base station 1108 can additionally configure a victim UE 1102 with a CLI measurement resource (e.g., associated with the CLI Tx resource 1112 described above). For example, base station 1108 can configure victim UE 1102 with an RRC configuration of AP/SP/P CLI measurement resources 1114. Victim UE 1102 can use the AP/SP/P CLI measurement resources 114 to determine or obtain one or more CLI measurements of the aggressor UE 1104's transmission of the CLI Tx resources 1112.

For example, after configuring the aggressor UE 1104 with CLI Tx resources 1112 and configuring the victim UE 1102 with the CLI measurement resources 1114, the base station 1108 can trigger a CLI measurement and reporting process based on using a dedicated or group-common (GC) DCI 1116 to trigger aggressor UE 1104 to transmit the NZP-SRS associated with the previously configured CLI Tx resources 1112. Base station 1108 can additionally use a dedicated or group-common (GC) DCI 1118 to trigger victim UE 1102 to perform the CLI measurement and reporting process based on the previously configured CLI measurement resources 1114.

As illustrated, aggressor UE 1108 can transmit the Tx NZP-SRS 1122, which is received and measured by the victim UE 1102. In some aspects, the Tx NZP-SRS 1122 may additionally be received and/or measured by base station 1108. Based on receiving and measuring the Tx NZP-SRS 1122, the victim UE 1102 can generate and transmit an L1 CLI report 1124 to base station 1108. Base station 1108 can subsequently use the L1 CLI report 1124 to perform CLI management and adaptation (e.g., by scheduling the UL and/or DL of the victim UE 1102 and aggressor UE 1104 to minimize or avoid CLI).

In some aspects, an L1 CLI report (e.g., such as the L1 CLI report 1124) can be based on a CSI reporting framework and/or the L1 CLI report can be implemented as a type of CSI report. For example, the L1 CLI report can be implemented as a type of CLI report based on reportQuantity (e.g., can be implemented as an extension of the current CSI framework). In some aspects, the CLI measurement resource can be associated with IMR. In some examples, the CLI measurement resource can be associated with a new CLI-MR. A measurement resource configuration can be implemented as an IMR with ZP-SRS and/or CSI-IM. For example, a dummy CMR can be configured wherein the CLI is based on IMR with ZP-SRS or CSI-IM. In some examples, a dedicated CLI reporting framework can be utilized to provide a simplified report configuration. In some aspects, a CLI measurement resource (e.g., ZP-SRS or CSI-IM) can be associated with a CLI-MR. Based on the CLI being treated as a new UCI type, an impact on existing CSI processes can be minimized or reduced.

In some cases, inter-UE CLI can be CLI between one or more aggressor UEs and one or more victim UEs. A given UE can be only an aggressor UE, only a victim UE, or both an aggressor UE and a victim UE. For example, the given UE can be an aggressor UE to a first set of additional UEs and may be a victim UE to a second set of additional UEs. The first and second set of additional UEs may be disjoint sets or may be overlapping sets.

In some examples, inter-UE CLI identification and/or mitigation procedures can be performed based on CLI information determined for a given set of UEs. For example, inter-UE CLI identification and/or mitigation can be performed based on an L1 CLI report (e.g., such as the L1 CLI report 1124 illustrated in FIG. 11) and/or can be performed based on or using an L1 CLI framework (e.g., such as the L1 CLI framework 1100 illustrated in FIG. 11).

For example, a base station (e.g., gNB) can use CLI information for a set of UEs to determine one or more UE groupings to reduce the occurrence of CLI (e.g., to reduce the occurrence of the CLI reported to the base station in the CLI measurement reports from the set of UEs). In some aspects, the base station can group the set of UEs into groupings of co-scheduled UEs, wherein the co-scheduled UEs of a given group can transmit (e.g., transmit UL transmissions) and/or receive (e.g., receive DL transmissions) at a same time or in a same time window. For example, the co-scheduled UEs of a given group can be co-scheduled with different directions in SBFD slots, in examples wherein the co-scheduled UEs are full-duplex UEs implementing SBFD.

In some aspects, a base station can perform UE grouping to separate some (or all) of the aggressor UEs from some (or all) of the victim UEs. For example, one or more groups of co-scheduled UEs can include aggressor UEs, such that the victim UEs do not receive while the groups of aggressor UEs are transmitting. One or more groups of co-scheduled UEs can include victim UEs, such that the aggressor UEs do not transmit while the groups of victim UEs are receiving.

In some examples, UE grouping for inter-UE CLI mitigation can be performed based on CLI reporting information, as mentioned previously. For example, a base station (e.g., gNB) can use CLI reporting information (e.g., such as L1 CLI reports 1124) to generate an interference graph for determining one or more dominant aggressors for each victim UE.

Figure 12:
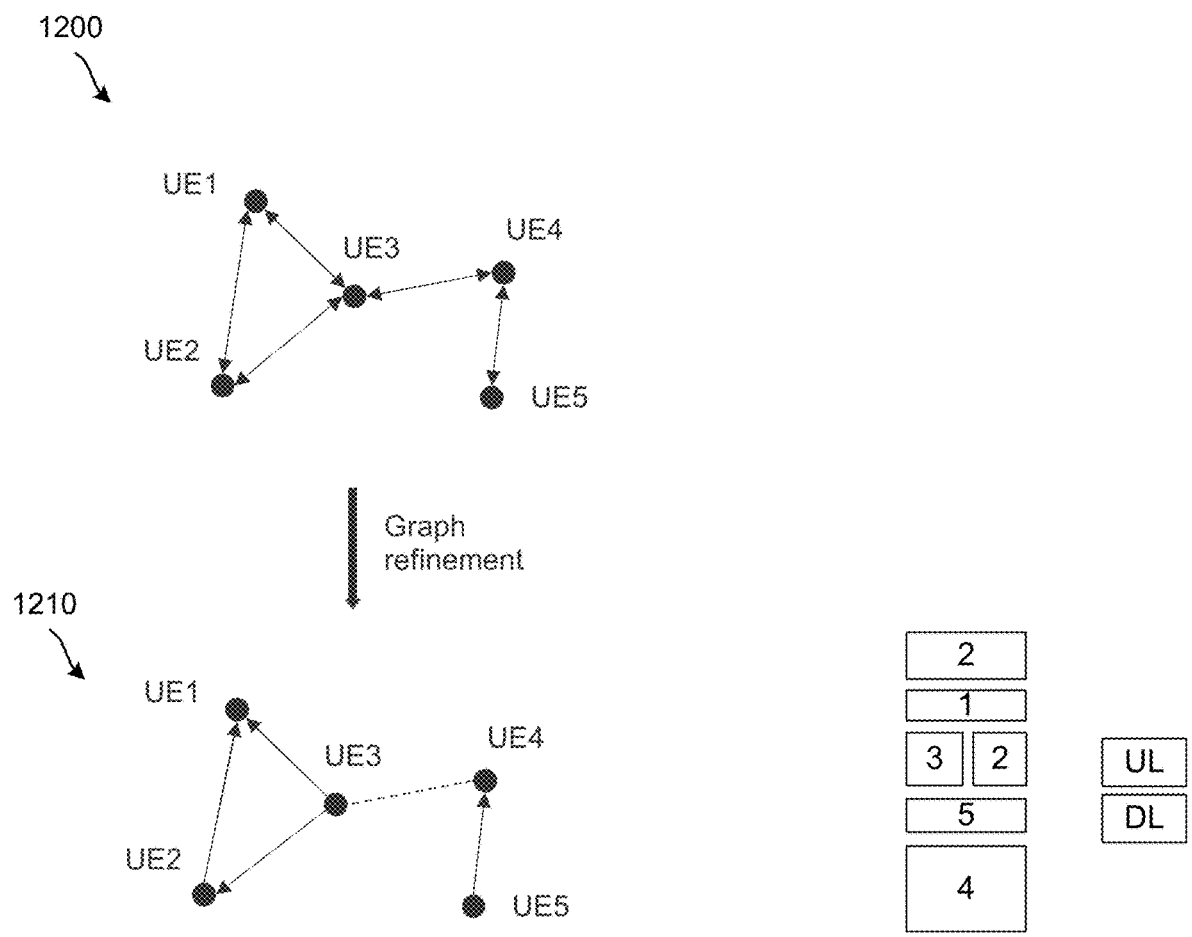
FIG. 12 is a diagram illustrating an example of interference graphs that can be used to determine one or more dominant aggressor UEs for one or more victim UEs, in accordance with some examples.

FIG. 12 is a diagram illustrating an example of interference graphs 1200 and 1210 that can be used to determine or identify one or more dominant aggressors for each victim UE in a given set of UEs. In some aspects, the interference graphs 1200 and/or 1210 can be inter-UE CLI interference graphs. For example, the interference graph 1200 can be generated for a set of UEs that includes a UE1, UE2, UE3, UE4, and UE5. Each UE can be represented as a node in the interference graph 1200, with the edges of interference graph 1200 representing relationships between the pair of UEs associated with the respective nodes connected by a given edge. For example, an edge between UE1 and UE3 can represent a transmission between UE1 and UE3 and/or can represent CLI between UE1 and UE3.

In some examples, the edges included in interference graph 1200 can be directional. For example, a directional edge connecting UE1 and UE3 can represent a UL transmission from UE1 to UE3 (e.g., a DL transmission received by UE3 from UE1) and/or can represent CLI in which UE1 is the aggressor UE and UE3 is the victim UE. A directional edge connecting UE3 to UE1 can represent a UL transmission from UE3 to UE1 (e.g., a DL transmission received by UE1 from UE3) and/or can represent CLI in which UE3 is the aggressor UE and UE1 is the victim UE. As illustrated in FIG. 12, the directionality of the edges between nodes/UEs in interference graphs 1200 and 1210 can be indicated via the arrows associated with each given edge. In some aspects, the interference graph 1200 can be generated by a base station (e.g., gNB) based on receiving CLI measurement and/or reporting information from some, or all, of the UEs (e.g., UE1-UE5).

In some examples, the base station (e.g., gNB) can use the interference graph 1200 to perform one or more CLI mitigation procedures. For example, the base station can use the interference graph 1200 to determine or identify one or more dominant aggressors for each victim UE included in interference graph 1200. In some aspects, a dominant aggressor for a given victim UE can be the aggressor UE that causes the largest amount of CLI for the victim UE. In some examples, the amount of CLI can be determined based on one or more CLI measurements included in the L1 CLI report 1124 generated by the victim UE and transmitted to the base station. For example, the L1 CLI report 1124 can include one or more Reference Signal Received Power (RSRP) values associated with an aggressor UE and measured by the victim UE.

In some cases, one or more scheduling-based CLI mitigation procedures can be implemented based on the interference graph 1200. For example, the base station can determine, allocate, and/or configure various ones of the UEs (e.g., UE1-UE5) with different time and/or frequency resources, such that the victim UEs and their respective dominant aggressor UE(s) do not transmit using the same time and/or frequency resources (e.g., by separating the transmit/receive resources scheduled to victim UEs and the transmit/receive resources scheduled to the dominant aggressor UE(s) for the victim UEs, CLI between the victim UEs and dominant aggressor UE(s) may be avoided). In some aspects, the base station can determine or modify one or more power control parameters based on the interference graph 1200 and/or based on the identification of victim UE-dominant aggressor UE(s) pairs, wherein the determined or modified power control parameters may additionally be seen to minimize an impact of CLI between the victim UEs and dominant aggressor UEs.

In some aspects, an inter-UE interference (e.g., inter-UE CLI) graph can be refined based on the optimized scheduling described above. For example, interference graph 1200 can be refined to generate a refined interference graph 1210. In some examples, a graph refinement process applied to interference graph 1200 can include separating the UEs (e.g., UE1-UE5) and/or the directional edges between the UEs into one or more co-scheduled groups, wherein the co-scheduled groups reduce CLI.

For example, refined interference graph 1210 can include a first co-scheduled group that includes UL transmissions transmitted by UE2, UE3, and UE5 (e.g., which can correspond to DL transmissions received by UE1, UE2, and UE4). A second co-scheduled group can be the inverse of the first co-scheduled group (e.g., UL transmissions transmitted by UE1, UE2, and UE4 and/or DL transmissions received by UE2, UE3, and UE5). Based on using the one or more co-scheduled groups to schedule UL transmission and DL reception between the set of UEs (e.g., UE1-UE5), the base station can reduce CLI by separating the dominant source of CLI for one or more (or all) of the given UEs into different time and/or frequency resources.

In some examples, one or more CLI mitigation optimizations can be implemented or performed based on the CLI information reported by the UEs and/or based on one or more of the CLI interference graphs 1200, 1210 generated by the base station (e.g., gNB). In some aspects, the CLI mitigation optimizations can be performed in combination with or in addition to the CLI scheduling refinement described above. In some aspects, the CLI mitigation optimizations can be performed separately from or instead of the CLI scheduling refinement described above. For example, the one or more CLI mitigation optimizations can include MCS optimization, rank optimization, and/or pre-coding optimization. In some aspects, enhanced CSI feedback can be generated and transmitted based on one or more interference hypotheses. The one or more interference hypotheses can include a projected CLI interference. For example, the base station can generate and transmit an interference hypothesis to a given UE. Subsequently, the UE can measure or determine CLI interference from one or more aggressor UEs and compare the measured CLI for a given aggressor UE to the projected CLI interference (e.g., from the interference hypothesis transmitted to the UE by the base station) for the same given aggressor UE. The enhanced CSI feedback can be generated based on one or more differences between the projected CLI interference and the actual or measured CLI interference.

In some aspects, one or more CLI reduction techniques can be implemented at one or more (or all) of the aggressor UEs included in the set of UEs (e.g., UE1-UE5). For example, the CLI reduction techniques can be based on implementing one or more pre-coding optimizations at the aggressor UEs in order to reduce a CLI interference caused by the aggressor UEs for one or more victim UEs. In some aspects, one or more CLI mitigation techniques can be implemented at one or more (or all) of the victim UEs included in the set of UEs (e.g., UE1-UE5). For example, the CLI mitigation techniques can be based on implementing one or more ranking or combining optimizations at the victim UEs in order to reduce a CLI interference experienced by the victim UEs from one or more aggressor UEs.

In some aspects, aggressor identification based on a CLI interference graph (e.g., interference graph 1200 and/or refined interference graph 1210) constructed at the base station (e.g., gNB) can be performed based on the base station analyzing each UE included in the set of UEs (e.g., UE1-UE5) individually. In some examples, performing separate analyses of each UE as a victim UE using the base station can be a computationally complex and intensive process, particularly as the number of UEs being analyzed increases.

Figure 13:
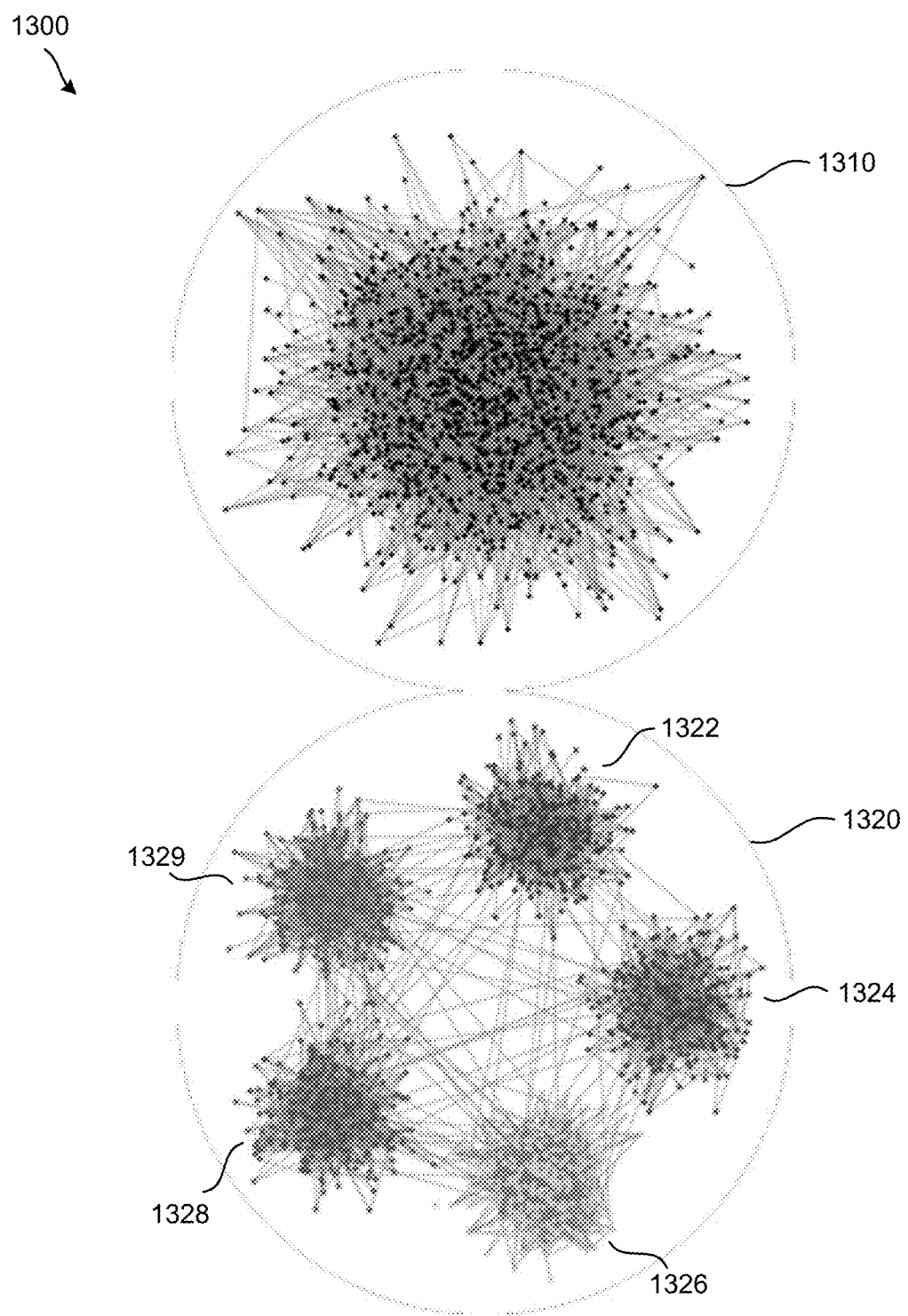
FIG. 13 is a diagram illustrating an interference graph and a clustered (e.g., grouped) interference graph, in accordance with some examples.

For example, FIG. 13 is a diagram illustrating an interference graph 1310 and a clustered (e.g., grouped) interference graph 1320. In some aspects, the clustered interference graph 1320 can be generated based on performing community detection, clustering, grouping, etc., for the interference graph 1310. In some aspects, the interference graph 1310 can be generated in a manner that is the same as or similar to that described above for the interference graph 1200 illustrated in FIG. 12, with the interference graph 1310 including a larger quantity of nodes (e.g., UEs) than the interference graph 1200.

In some examples, community detection in random graphs can be utilized to divide a random graph (e.g., or other graph input) into a set of groups. For example, one or more nodes and/or edges included in an input graph can be divided into a set of one or more groups, with each given group including nodes and/or edges that are similar in or along one or more dimensions. In some aspects, community detection can be performed for an initially constructed interference graph (e.g., interference graph 1300), which may be approximated as a random graph based on the base station (e.g., gNB) initially lacking knowledge of the aggressor-victim relationships between the UEs included in the interference graph 1300.

In one illustrative example, community detection can be performed to divide interference graph 1300 into one or more groups of victim UEs and aggressor UEs. For example, the initial interference graph 1300 can be clustered or grouped into a plurality of groups 1322, 1324, 1326, 1328, and 1329 that are included in clustered interference graph 1320. In some aspects, the plurality of groups 1322, 1324, 1326, 1328, 1329 can be generated based on one or more similarity factors and/or other clustering or grouping factors other than a determination of whether a given UE (e.g., a given node) is a victim UE or an aggressor UE. For example, the plurality of groups can be generated to include nodes and/or edges that are associated with one or more similar behaviors or other characterizing factors.

In some aspects, interference graph 1300 can be clustered or grouped into one or more groups (e.g., such as groups of victim UEs and groups of aggressor UEs) based on max-likelihood detection. Max-likelihood detection can be performed by a centralized node (e.g., such as a base station or gNB), but may require a complete knowledge or information representing a current state of the interference graph 1300 (e.g., max-likelihood detection may require a base station or gNB to obtain complete information of interference graph 1300, which may be associated with excessive amounts of UE reporting of CLI measurement report information to the base station or gNB).

In some aspects, interference graph 1300 can be clustered or grouped into one or more groups (e.g., such as groups of victim UEs and groups of aggressor UEs) based on belief propagation detection. For example, belief propagation detection can be performed based on message exchange and distributed processing between one or more UEs and/or subsets of UEs that are included in the overall set of UEs being analyzed for inter-UE CLI interference (e.g., the set of UEs represented as nodes in interference graph 1300).

In some cases, a given UE (or sub-set of UEs) can exchange messages with adjacent UEs and/or can exchange messages with one or more pre-determined UEs also included in interference graph 1300. For example, a given UE (or subset of UEs) can exchange information with nearby UEs and/or other UEs that may be either victim UEs and/or aggressor UEs relative to the given UE. Based on the message exchange between the UEs included in interference graph 1300, each UE can perform distributed processing to process the exchanged information (e.g., each UE can process the information that it received). In one illustrative example, the messages exchanged between UEs can be CLI measurement report information (e.g., such as the CLI report 1124 illustrated in FIG. 11) and the distributed processing can be performed such that the UEs locally determine a belief, classification, grouping, etc., about themselves.

In one illustrative example, the nodes (e.g., UEs) included in interference graph 1300 can transmit information about themselves (e.g., a determined belief) and/or can transmit a determined probability that the node (e.g., UE) belongs to a certain group. For example, in belief propagation detection, the distributed processing performed at some (or all) of the UEs can include determining a belief about the UEs classification, grouping, or clustering (e.g., as an aggressor UE, as a victim UE, a probability of being an aggressor UE and/or a victim UE, etc.). In another example, the distributed processing performed at some (or all) of the UEs can include determining a probability about the UEs classification, grouping, or clustering (e.g., a probability that the UE is an aggressor UE, a probability that the UE is a victim UE, a probability that the UE is an aggressor UE and/or a victim UE, etc.). In some aspects, one or more of the probabilities and/or beliefs can be relative to the UE being an aggressor and/or victim UE relative to one or more other UEs. In some cases, one or more of the probabilities and/or beliefs can be relative to the UE being an aggressor and/or victim UE, independent of any other specific UEs involved in the aggressor or victim UE relationship(s).

In some examples, belief propagation detection may be performed in a cellular network (e.g., the UEs can communicate with one or more base stations or gNBS included in a cellular network), and the UEs may send one or more reference signals (RSs) in different directions. Based on an RS transmitted by a given UE and being detected by one or more additional UEs, the one or more additional UEs may determine that they are victim UEs relative to the given UE (e.g., the given UE acts as an aggressor UEs relative to the one or more additional UEs that detect the transmitted RS and/or that detect the transmitted RS above a pre-determined threshold RSRP).

In one illustrative example, the systems and techniques described herein can be utilized to perform community detection to group a plurality of UEs into one or more groups of aggressor UEs (e.g., causing CLI to other UEs) and victim UEs (e.g., experiencing CLI from other UEs). In some aspects, the community detection can be performed for a plurality of UEs included in a CLI interference graph and/or can be utilized to generate a grouped or clustered CLI interference graph, wherein the CLI interference graph (and/or clustered CLI interference graph) includes the plurality of UEs.

In some aspects, the systems and techniques can utilize community detection to generate a directed and/or weighted CLI interference graph that includes the plurality of UEs as nodes. The direction of a given edge connecting two nodes can represent a directionality or CLI relationship between the pair of UEs associated with the two nodes. For example, an edge connecting a first UE and a second UE can represent a relationship in which the first UE is an aggressor UE to the second UE (e.g., which is a victim UE) based on the edge having a directionality that runs from the first UE to the second UE. A directionality that runs from the second UE to the first UE can represent a situation in which the second UE is an aggressor UE to the first UE (e.g., which is a victim UE). A bi-directional edge can represent a relationship in which the first UE is an aggressor to the second UE and the second UE is also an aggressor to the first UE. In some aspects, the origin of a given edge can be a node associated with or representing an aggressor UE and the destination or terminus of the given edge can be a node associated with or representing a victim UE (e.g., of the aggressor UE at the origin of the edge). For example, the directionality of the edges in the CLI interference graph generated using the systems and techniques described herein can be indicative of a source and a destination of the aggression (e.g., a source and a destination of the CLI).

In some aspects, one or more (or all) of the edges included in the CLI interference graph generated using the systems and techniques described herein can be indicative of a severity of the aggression between an aggressor UE (e.g., at the origin of the weighted and directed edge) and a victim UE (e.g., at the terminus of the weighted and directed edge). For example, a weight of a given edge included in a CLI interference graph generated using the systems and techniques can be the same as or otherwise based on a Reference Signal Received Power (RSRP) measured by the victim UE for a CLI measurement signal (e.g., the AP/SP/P NZP-SRS 1112 illustrated in FIG. 11) transmitted by a corresponding aggressor UE (e.g., the aggressor UE connected to the victim UE by the given edge).

In one illustrative example, the systems and techniques can generate and refine a CLI interference graph for a plurality of UEs based on performing one or more rounds or iterations of CLI training sessions. In some aspects, the plurality of UEs can be associated with a same wireless communication network (e.g., a cellular communication network), wherein the same wireless communication network includes one or more base stations (e.g., gNBs). In some cases, the network can establish and/or configure the one or more CLI measurement and reporting training sessions using RRC configured parameters, as will be described in greater depth below. In some aspects, the network can activate or trigger the one or more CLI measurement and reporting training sessions using a DCI indication, as will also be described in greater depth below.

Figure 14:
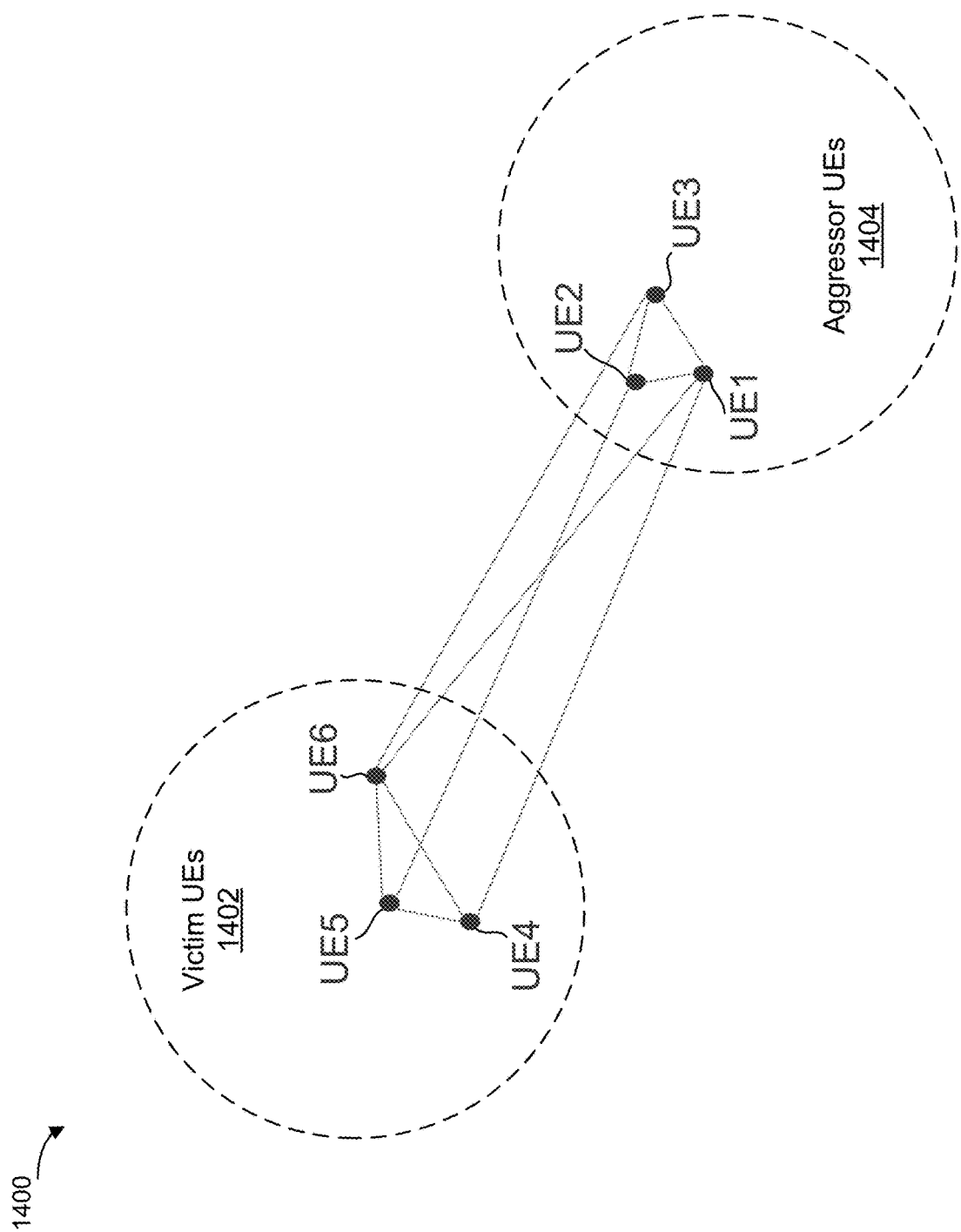
FIG. 14 is a diagram illustrating an example network environment in which one or more CLI measurement and reporting training session iterations can be implemented, in accordance with some examples.

FIG. 14 is a diagram illustrating an example network environment 1400 in which aspects of the present disclosure may be implemented. For example, FIG. 14 depicts a plurality of UEs (e.g., UE1, UE2, UE3, UE4, UE5, UE6) that can be used to perform iterative CLI measurement and reporting training sessions for performing distributed community detection and/or generating a clustered CLI interference graph.

In some aspects, the one or more CLI measurement and reporting training sessions (e.g., also referred to as training sessions) can be used to perform community detection and/or to group the plurality of UEs into a set of aggressor UE groups and victim UE groups. In a given iteration, one or more UEs can transmit a reference signal (RS). For example, the RS transmitted by the one or more UEs in a given iteration can be an NZP-SRS (e.g., such as the AP/SP/P NZP-SRS 1122 illustrated in FIG. 11. The NZP-SRS may also be referred to as a Tx NZP-SRS (e.g., such as the Tx NZP-SRS illustrated in FIG. 11).

The one or more UEs that transmit the reference signal can be selected or configured by a base station (e.g., gNB) using RRC information. For example, the base station (e.g., gNB) can transmit RRC information to the plurality of UEs wherein the RRC information includes one or more configuration parameters for performing the iterative training sessions. In one illustrative example, the RRC iterative training session configuration information can be indicative of one or more probabilities with which a given UE determines whether to transmit a CLI measurement RS in a given iteration or to receive transmitted CLI measurement RSs in a given iteration. In some aspects, the transmit/receive probability associated with a given UE can be determined based on a configured model (e.g., wherein the configured model is signaled to the plurality of UEs using the RRC information transmitted by the base station or gNB).

In some aspects, a pseudo-random configured approach can be utilized to control whether each given UE should transmit or receive the Tx NZP-SRS or other reference signal in a given training session iteration. For example, the pseudo-random configured approach can be based on the base station (e.g., gNB) including a seed value in the RRC configuration information, such that each UE utilizes the same seed value and same pseudo-random configuration approach. Based on each UE utilizing the same seed value and same pseudo-random configuration approach, any given UE of the plurality of UEs may be aware of whether the given UE has been configured to transmit the NZP-SRS or has been configured to receive transmitted NZP-SRSs. In some cases, any given UE of the plurality of UEs may further be aware of how other UEs (e.g., of the plurality of UEs) have been configured, such that UEs configured to receive transmitted NZP-SRSs are aware of the sources of the transmitted NZP-SRSs (e.g., the aggressor UEs to the UE that receives a transmitted NZP-SRS in a given training session iteration).

In one illustrative example, the RRC configuration information (e.g., transmitted by the base station or gNB to the plurality of UEs) can include beam and/or power configuration information for transmitting the NZP-SRS. For example, the RRC configuration information can configure one or more resources that a given transmitting UE should use to transmit the NZP-SRS. In some aspects, each victim UE may be able to determine the source of any detected interference (e.g., CLI) based on the resource on which the NZP-SRS or CLI was detected or measured and based on the pseudo-random parameters or other configuration information indicating which UEs are the transmitting UEs for a given training session iteration.

For example, each transmitting UE of the configured transmitting UEs of a given training session iteration may select Tx resources (e.g., for transmitting the Tx NZP-SRS) and/or each receiving UE of the configured receiving UEs of the same given training session iteration may select measurement resources with either a configured probability or based on a state-space model. The probability and/or state space model for selecting Tx and/or measurement resources can be determined based on the RRC training session configuration information transmitted to the plurality of UEs by the base station or gNB. In some aspects, the selected Tx resources for transmitting the Tx NZP-SRS can be the same as or similar to the RRC configured AP/SP/P NZP-SRS resources 1112 illustrated in FIG. 11. In some aspects, the selected measurement resources for measuring transmitted Tx NZP-SRSs can be the same as or similar to the RRC configured AP/SP/P CLI measurement resources 1114 illustrated in FIG. 11.

In a given iteration of the CLI measurement and reporting training sessions, one or more UEs (e.g., of the plurality of UEs) can be selected or configured (e.g., using an RRC configuration information transmitted by a base station or gNB) to transmit an RS or SRS. As mentioned previously, the RS or SRS can include the Tx NZP-SRS. For example, as illustrated in FIG. 14, a first group of UEs 1404 may be selected to act as aggressor (e.g., transmitting) UEs and transmit a Tx NZP-SRS. In some aspects, the remaining UEs (e.g., of the plurality of UEs) not selected to or included in the group of aggressor UEs 1404 can act as victim (e.g., receiving) UEs 1402.

The aggressor UEs 1404 can each transmit an NZP-SRS in one or more directions, based on configured beam, power, etc., parameters configured by the RRC configuration parameters from the base station or gNB. In some examples, in at least a first iteration of the CLI measurement and reporting training session, the aggressor UEs 1404 can each transmit an NZP-SRS in all directions. The remaining or non-aggressor UEs (e.g., victim UEs 1402) can each measure an interference or CLI associated with the NZP-SRS transmitted by each aggressor UE included in the group of aggressor UEs 1404. For example, the victim UEs 1402 can each measure (or attempt to measure) an RSRP of each NZP-SRS transmitted by the group of aggressor UEs 1404.

If a victim UE (e.g., included in the group of victim UEs 1402) does not receive the NZP-SRS transmitted by a given aggressor UE (e.g., included in the group of aggressor UEs 1404), or if the RSRP of the NZP-SRS transmitted by a given aggressor UE is below a pre-determined threshold (e.g., configured by the base station or gNB in the RRC configuration information), then the victim UE can determine that the given aggressor UE is not an aggressor UE to the victim UE. If the victim UE does receive the NZP-SRS transmitted by a given aggressor UE and/or if the RSRP of the NZP-SRS transmitted by the given aggressor UE is above a pre-determined threshold, then the victim UE can determine that the given aggressor UE is an aggressor UE to the victim UE.

In some aspects, for a given training session iteration, each victim UE included in the group of victim UEs 1402 (e.g., wherein the UEs included in the group of victim UEs 1402 may vary across different training session iterations) can attempt to measure the interference/CLI associated with a transmission (e.g., RSRP of the NZP-SRS) from each aggressor UE included in the group of aggressor UEs 1404 (e.g., which may also vary across different training session iterations). Based on the measurements obtained by each victim UE for the given training session iteration, each victim UE may generate feedback information (e.g., a CLI measurement report the same as or similar to the L1 CLI report 1124 illustrated in FIG. 11) indicative of the CLI between the victim UE and each of the aggressor UEs 1404.

As mentioned previously, if a victim UE does not receive the NZP-SRS transmitted by a given aggressor UE, the victim UE can generate feedback information indicating that the given aggressor UE is not an aggressor to the victim UE. If the victim UE does receive the NZP-SRS transmitted by the given aggressor UE but measures an RSRP that is below a pre-determined threshold (e.g., configured by the RRC configuration information from the base station or gNB), then the victim UE can generate feedback information indicating that the given aggressor UE is not an aggressor to the victim UE.

If the victim UE does receive the NZP-SRS transmitted by a given aggressor UE and/or the victim UE measures an RSRP that is above a pre-determined threshold, then the victim UE can generate feedback information indicating that the given aggressor UE is an aggressor to the victim UE. In some aspects, when the victim UE determines that a given one of the aggressor UEs 1404 for the current training session iteration is an aggressor to the victim UE (e.g., causes CLI at the victim UE), the victim UE can generate feedback information that is further indicative of a strength of the aggression. For example, the victim UE can generate feedback information that includes the RSRP measured by the victim UE for the NZP-SRS transmitted by the given aggressor UE.

In one illustrative example, each victim UE (e.g., of the group of victim UEs 1402) can transmit their respective locally generated feedback information to a base station or gNB (e.g., the base station or gNB that transmitted the RRC configuration information for the current training session iteration to the plurality of UEs). In some aspects, the victim UEs can distribute their respective locally generated feedback information to one or more (or all) of the remaining UEs included in the plurality of UEs.

In some aspects, each UE can utilize the feedback information generated in a given training session iteration to locally determine or otherwise update a current UE belief as to whether the UE is an aggressor, a victim, or both. In some aspects, the current UE belief can additionally include information indicative of the aggressor UEs to the UE (e.g., when the UE acts as a victim UE), information indicative of the victim UEs to the UE (e.g., when the UE acts as an aggressor UE), or both.

In one illustrative example, subsequent rounds or iterations of training sessions can be performed based on the RRC configuration information transmitted to the plurality of UEs. For example, subsequent rounds or iterations of training sessions can be performed in a manner that is the same as or similar to that described above, with the composition of UEs included in the group of victim UEs 1402 and the composition of UEs included in the group of aggressor UEs 1404 varying across iterations.

In some aspects, based on performing multiple training session iterations, each having a different composition of aggressor UEs 1404 and victim UEs 1402, the plurality of UEs can measure and report CLI feedback information associated with each training session iteration and the plurality of UEs may converge to a clustered CLI interference graph indicative of the various aggressor and victim UE relationships that are currently present between the plurality of UEs. In some aspects, each UE of the plurality of UEs may update its belief(s) based on the CLI feedback information reported at the end of each training session iteration, wherein each UEs belief information includes a set of one or more UEs that are aggressors to the UE and a set of one or more UEs that are victims to the UE. In some aspects, the UE belief information can further include weight information (e.g., associated with the edges connecting the node associated with the UE to each respective node associated with an aggressor or victim UE relative to the UE). The weight information can be indicative of a strength of the interference or CLI between the UE and its aggressor and victim UEs.

In some aspects, the transmitting (e.g., aggressor) UEs 1404 configured to transmit NZP-SRS in an initial training session iteration may initially transmit the NZP-SRS in all directions (e.g., transmit in all directions for at least the first or initial training session iteration). In subsequent training session iterations, one or more of a beam and/or power configuration used to transmit the NZP-SRS by the transmitting (e.g., aggressor) UEs 1404 can be adjusted based on the feedback information reported by victim UEs in prior training session iterations. For example, prior to (and during) the initial training session iteration, each UE may be unaware of the location and/or quantity of the remaining UEs included in the plurality of UEs. After the initial training session iteration has been performed, and the associated CLI feedback information has been received, the UEs may update not only their belief regarding their own status as an aggressor and/or victim UE to the remaining UEs but may also update their belief or knowledge as to the existence and relative position of some (or all) of the remaining UEs included in the plurality of UEs.

For example, each aggressor UE 1404 may initially transmit the NZP-SRS in all directions in the first or initial training session iteration. Subsequently, when the same UE is again configured as a transmitting or aggressor UE in a subsequent training session iteration, the UE may use its knowledge of the UEs to which it is an aggressor (e.g., the knowledge of the its victim UEs) to perform beam steering or otherwise transmit the NZP-SRS using beams in the direction of a known, probable, or possible victim UE (e.g., if a given UE has previously determined, based on CLI feedback information from previous training session iterations, that there are no victim UEs in one or more beam directions, then the given UE may not transmit the NZP-SRS in the one or more beam directions in a subsequent training session iteration in which the given UE is again configured as a transmitting or aggressor UE 1404).

In one illustrative example, the RRC configuration information transmitted by a base station (e.g., gNB) can be indicative of a training algorithm to be used by the plurality of UEs in determining the clustering or community detection information (e.g., a training algorithm to be used by the plurality of UEs in determining the aggressor and victim UE information using distributed learning). For example, the RRC configuration information can indicate that the plurality of UEs should use a belief propagation training algorithm, a belief propagation with side information training algorithm, etc.

In some aspects, belief propagation with side information can be associated with the plurality of UEs sharing one or more parameters with other UEs during the one or more training session iterations (e.g., sharing one or more parameters additional to the CLI feedback or measurement report information described above). For example, the one or more shared parameters can be used to augment or assist in the training model. In one illustrative example, the side information and/or the one or more parameters can include information such as a probability of a given UE being a victim UE or an aggressor UE, wherein the probability is determined locally at each given UE based on feedback information and/or locally measured RSRP information of the transmitted NZP-SRSs. In some aspects, the probability reported to the other UEs by a given UE can be a current or most up-to-date probability determined by the given UE (e.g., the probability determined by the given UE using the information received up to the moment of the probability information sharing). In some cases, the RRC configuration information transmitted by the base station or gNB can be UE-specific (e.g., different RRC configuration information can be transmitted by the base station or gNB to one or more different UEs included in the plurality of UEs). In some examples, based on the RRC configuration information being UE-specific, one or more (or all) of the UEs included in the plurality of UEs can be configured to report different quantities or beliefs to one or more (or all) of the remaining UEs included in the plurality of UEs.

In some aspects, the RRC configuration information transmitted by the base station (e.g., gNB) can include a length of the training session or a termination trigger/methodology for ending the iterative training session process. For example, the length of the training session can be specified as an amount of time, a number of training session iterations, etc. In some aspects, a termination trigger or methodology can specify a combination of a maximum number of training session iterations, a maximum number of training session iterations, a specific training session termination time, various combinations thereof, etc. In some examples, a termination trigger or methodology can be indicative of a termination condition, such as a termination condition indicating a criterion for evaluating the convergence of the clustered CLI interference graph generated via the plurality of training session iterations. In some examples, a set of training sessions (e.g., a plurality of training session iterations performed consecutively) can be triggered by the base station or gNB transmitting a training session trigger to the plurality of UEs. For example, the training session trigger can be a group-common (GC) DCI that activates the training session. The training session trigger can be configured to activate the training session(s) immediately in response to the plurality of UEs receiving the training session trigger and/or can be configured to schedule a future start time (e.g., future trigger time) for the plurality of UEs to begin performing the iterative training sessions.

As mentioned previously, the receiving (e.g., victim) UEs can generate and transmit CLI measurement reporting information for each training session iteration. In some aspects, each UE included in the receiving or victim UEs 1402 can generate and transmit CLI measurement reporting information to one or more (or all) of the remaining UEs included in the plurality of UEs. Additionally, or alternatively, each UE included in the receiving or victim UEs 1402 can generate and transmit the CLI measurement reporting information to the base station or gNB. In some aspects, the CLI measurement reporting information can be reported individually or can be reported in groups. For example, grouped reporting of CLI measurement reporting information can be performed based on one or more UEs being configured as reporting UEs. Reporting UEs can receive or accumulate the individual CLI measurement reporting information reported by individual UEs and consolidate the individual CLI measurement reporting information into a grouped CLI measurement report. Each reporting UE can then transmit the grouped CLI measurement report to the remaining UEs included in the plurality of UEs and/or can transmit the grouped CLI measurement report to the base station or gNB associated with the plurality of UEs.

In some aspects, CLI measurement reporting can be triggered based on an RRC configuration or RRC configuration information transmitted from the base station (e.g., gNB) to the plurality of UEs. In some examples, the CLI measurement reporting can be the same as or similar to the L1 CLI report 1124 illustrated in FIG. 11 (e.g., as previously described above). In some examples, the CLI measurement reporting generated and/or transmitted by a given UE (e.g., included in the plurality of UEs) can include an indication of whether or not the given UE acts as an aggressor or a victim. For example, the CLI measurement reporting can be indicative of whether the UE acts as an aggressor UE or a victim UE in the given training session iteration for which the CLI measurement reporting was generated (e.g., recalling that a given UE may act as both an aggressor UE and a victim UE in relation to the plurality of remaining UEs, but that in a given training session iteration, the given UE will act as either an aggressor (e.g., transmitting) UE or a victim (e.g., receiving) UE, but not both).

In some aspects, a given UE can generate and transmit CLI measurement reporting information that includes a direction of aggression and an indication (e.g., a listing or other identification) of which UEs are acting as aggressors to the given UE. In some cases, the given UE can generate and transmit CLI measurement reporting information that further indicates a severity and/or magnitude of the interference (e.g., CLI) associated with each identified aggressor UE for the given UE. For example, the CLI measurement reporting information can include a Received Reference Signal Power (RSRP) and/or a Received Signal Strength Indicator (RSSI) value for the NZP-SRS measured by the given UE for each identified aggressor UE.

In one illustrative example, UE1 illustrated in FIG. 14 may generate and transmit CLI measurement reporting information that indicates a set of UEs for which UE1 acts as an aggressor (e.g., a set of UEs that are victims to UE1) and a set of UEs for which UE1 acts as a victim (e.g., a set of UEs that are aggressors to UE1). For example, UE1 may generate and transmit CLI measurement reporting information that indicates that UE1 acts as an aggressor to UE2, UE3, and UE6 and that UE1 acts as a victim to UE2, UE4, and UE5.

In some aspects, the CLI measurement reporting information may indicate a severity or magnitude of the CLI between UE1 and its identified aggressor and/or victim UEs. For example, UE1 can generate and transmit CLI measurement reporting information indicating: {Aggressor to: (UE2, UE4, UE5); Interference/CLI level: (2 dB, 10 dB, 15 dB)}, {Victim to: (UE2, UE4, UE5); Interference/CLI level: (2 dB, 10 dB, 15 dB)}.

In one illustrative example, the CLI measurement reporting information can be transmitted as individual reports (e.g., one CLI measurement reporting information per UE included in the plurality of UEs) or can be transmitted as group reports (e.g., one CLI measurement reporting information is associated with multiple different UEs included in the plurality of UEs). In some examples, a single grouped report can be generated and transmitted that includes the CLI measurement reporting information associated with each UE included in the plurality of UEs. In some aspects, the CLI measurement reporting information (e.g., either individual or grouped) can be transmitted using a physical uplink control channel (PUCCH) transmission and/or a physical uplink shared channel (PUSCH) transmission to the base station (e.g., gNB).

Figure 15A:
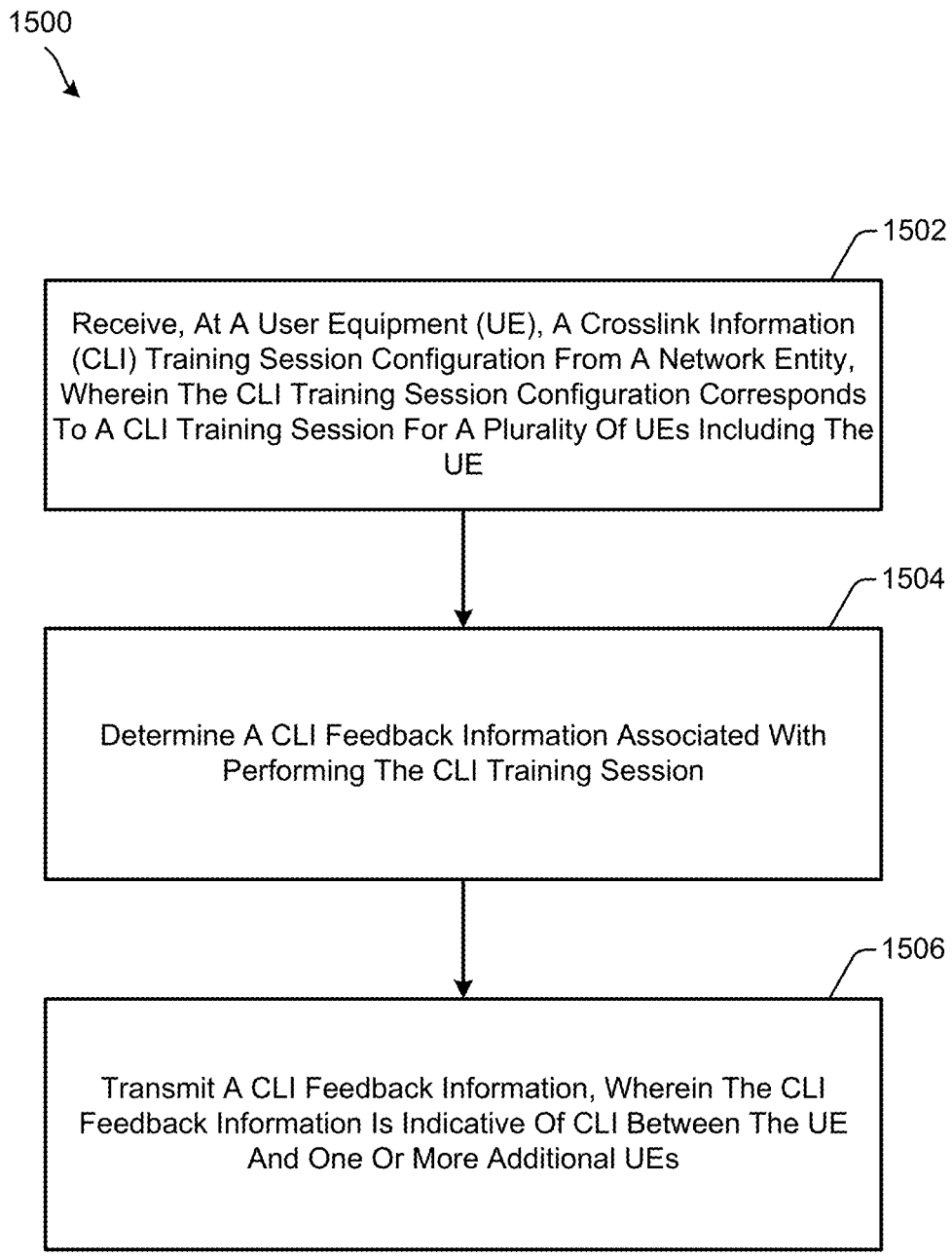
FIG. 15A is a flow chart illustrating an example of a process for wireless communications at a user equipment (UE), in accordance with some examples.

FIG. 15A is a flow chart illustrating an example of a process 1500 for wireless communications at a user equipment (UE). At block 1502, the process 1500 includes receiving a crosslink interference (CLI) training session configuration from a network entity, wherein the CLI training session configuration corresponds to a CLI training session for a plurality of UEs including the UE. For example, the network entity can be the same as or similar to one or more of the base stations 102, 180 illustrated in FIG. 1, the base station 102 illustrated in FIG. 2, the O-RAN illustrated in FIG. 3, the base stations 705*a* and/or 705*b* illustrated in FIG. 7, the base station 1108 illustrated in FIG. 11, etc. In some examples, the UE can be the same as or similar to one or more of the UEs 104 illustrated in FIGS. 1 and 2, the UEs 320 illustrated in FIG. 3, the electronic device 607 illustrated in FIG. 6, the UEs 715*a*, 715*b*, 715*c*, 715*d* illustrated in FIG. 7, the UEs 1102, 1104 illustrated in FIG. 11, the UEs UE1-UE5 illustrated in FIG. 12, the UEs UE1-UE6 illustrated in FIG. 14, etc.

In some examples, the plurality of UEs can be associated with the same network entity and can receive the same CLI training session configuration from the network entity. For example, the CLI training session configuration can be included in a radio resource control (RRC) message received at the UE and/or the plurality of UEs from the network entity (e.g., the RRC message including the CLI training session configuration can be transmitted by the network entity). In some examples, the CLI training session configuration can include the RRC configuration of AP/SP/P NZP-SRS 1112 illustrated in FIG. 11 and/or can include the RRC configuration of AP/SP/P CLI measurement resources illustrated in FIG. 11.

At block 1504, the process 1500 includes determining a CLI feedback information associated with performing the CLI training session. For example, the CLI training session can be performed by the one or more UEs (e.g., the plurality of UEs including the UE) based on receiving a training session trigger from the network entity. In some examples, the training session trigger can be included in a group-common downlink control information (DCI) received from the network entity and associated with the UE and the one or more additional UEs. In some examples, the training session trigger can be the same as or similar to the dedicated/GC DCI triggering NZP-SRS 1116 illustrated in FIG. 11 and/or can be the same as or similar to the dedicated/GC DCI triggering CLI measurement/reporting 1118 illustrated in FIG. 11.

In some examples, the UE can transmit a CLI reference signal based on the CLI training session configuration received from the network entity. For example, the CLI reference signal can include the Tx NZP-SRS 1122 illustrated in FIG. 11. In some cases, the UE can receive one or more CLI feedback information reports transmitted by a respective one or more additional UEs (e.g., that are included in the plurality of UEs). The one or more CLI feedback information reports can correspond to the transmitted CLI reference signal. For example, the one or more additional UEs can generated the CLI feedback information reports based on measuring or determining a CLI associated with the CLI reference signal transmitted by the UE.

In some cases, the CLI reference signal can be transmitted (e.g., by the UE) using a non-zero power (NZP) Sounding Reference Signal (SRS) using one or more SRS resources determined based on the CLI training session configuration received from the network entity.

In some examples, the UE may be a victim UE (e.g., such as the victim UEs 1402 illustrated in FIG. 14). The UE may receive one or more CLI reference signals, wherein each respective CLI reference signal of the one or more CLI reference signals is transmitted by an additional UE included in the plurality of UEs based on the CLI training session configuration. In some cases, the UE can transmit a CLI feedback information report based on the UE receiving the one or more CLI reference signals transmitted by the additional UEs. For example, the CLI feedback information report can be the same as or similar to the L1 CLI report 1124 illustrated in FIG. 11. In some cases, the UE can receive one or more non-zero power (NZP) Sounding Reference Signals (SRS) using one or more SRS resources determined based on the CLI training session configuration.

In some aspects, the CLI feedback information can be indicative of CLI associated with the UE acting as an aggressor UE with respect to the one or more additional UEs. For example, the UE can be the same as or similar to the aggressor UEs 1404 illustrated in FIG. 14. In some examples, the UE acting as an aggressor UE is based on the UE transmitting one or more communications causing CLI with respect to one or more communications received by the one or more additional UEs (e.g., victim UEs, such as the victim UEs 1402 illustrated in FIG. 14). For example, the one or more additional UEs can be victim UEs with respect to the UE.

In some aspects, the UE is configured to act as an aggressor UE (e.g., such as the aggressor UEs 1404 illustrated in FIG. 14) based on the CLI training session configuration received from the network entity. In some cases, the CLI feedback information may be indicative of CLI associated with the UE acting as a victim UE with respect to the one or more additional UEs. For example, the UE acting as a victim UE can be based on one or more communications transmitted by the one or more additional UEs causing CLI with respect to one or more communications received by the UE. In some cases, the one or more additional UEs are aggressor UEs with respect to the UE. In some cases, the UE can be configured to act as a victim UE based on the CLI training session configuration received from the network entity.

At block 1506, the process 1500 includes transmitting the CLI feedback information, wherein the CLI feedback information is indicative of CLI between the UE and one or more additional UEs. For example, the one or more additional UEs can be included in the same plurality of UEs as the UE. In some cases, transmitting the CLI feedback information is associated with the CLI training session. In some examples, the UE can transmit, to the network entity, a second CLI feedback information, wherein the second CLI feedback information is indicative of a second CLI between the UE and a second set of additional UEs included in the plurality of UEs, wherein the second set of additional UEs is different than the one or more additional UEs.

In some cases, the UE can transmit, to the network entity, a UE belief information, wherein the UE belief information is indicative of a determination that the UE is acting as an aggressor with respect to at least one additional UE or a determination that the UE is acting as a victim with respect to at least one additional UE. In some examples, the UE belief information can include or comprise a Received Reference Signal Power (RSRP) value or a Received Signal Strength Indicator (RSSI) value determined based on the UE receiving a CLI reference signal transmitted based on the CLI training session configuration. In some cases, the UE belief information further comprises a Received Reference Signal Power (RSRP) value or a Received Signal Strength Indicator (RSSI) value determined based on the UE transmitting a CLI reference signal based on the CLI training session configuration.

Figure 15B:
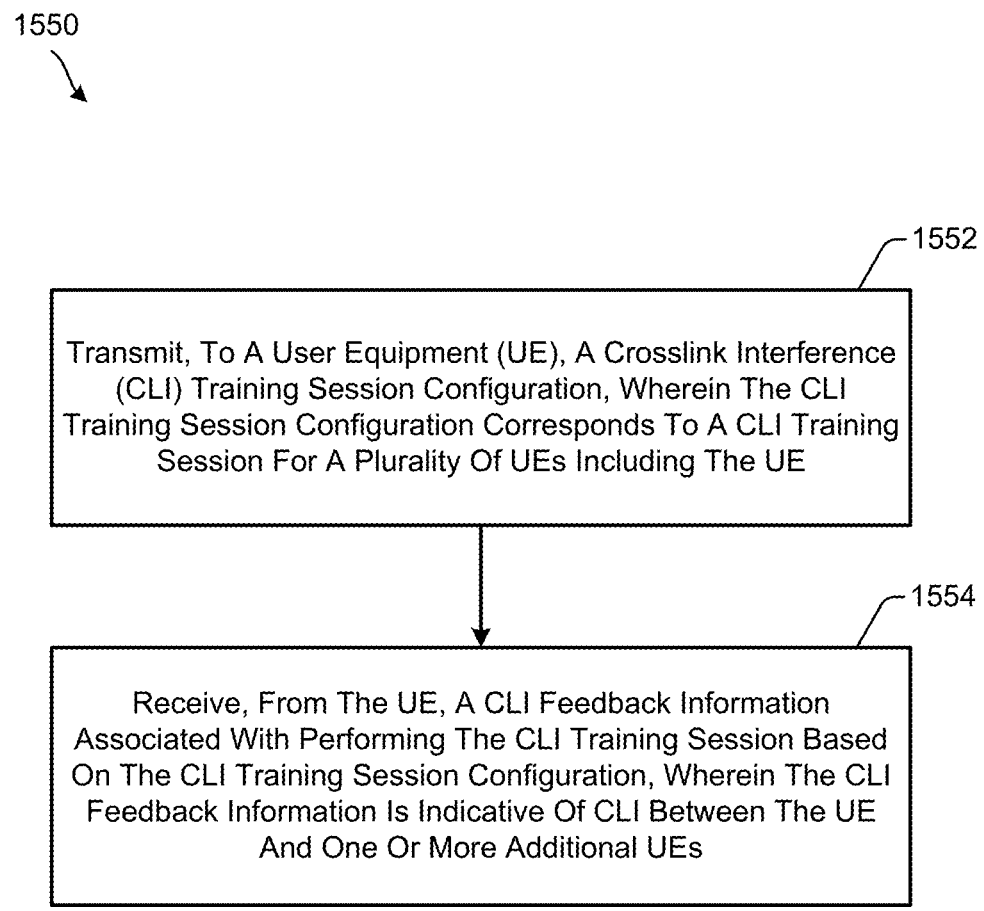
FIG. 15B is a flow chart illustrating an example of a process for wireless communications at a network entity, in accordance with some examples.

FIG. 15B is a flow chart illustrating an example of a process 1550 for wireless communications at a network entity. At block 1552, the process 1550 includes transmitting, to a user equipment (UE), a crosslink interference (CLI) training session configuration, wherein the CLI training session configuration corresponds to a CLI training session for a plurality of UEs including the UE. For example, the network entity can be the same as or similar to one or more of the base stations 102, 180 illustrated in FIG. 1, the base station 102 illustrated in FIG. 2, the O-RAN illustrated in FIG. 3, the base stations 705a and/or 705b illustrated in FIG. 7, the base station 1108 illustrated in FIG. 11, etc. In some examples, the UE can be the same as or similar to one or more of the UEs 104 illustrated in FIGS. 1 and 2, the UEs 320 illustrated in FIG. 3, the electronic device 607 illustrated in FIG. 6, the UEs 715a, 715b, 715c, 715d illustrated in FIG. 7, the UEs 1102, 1104 illustrated in FIG. 11, the UEs UE1-UE5 illustrated in FIG. 12, the UEs UE1-UE6 illustrated in FIG. 14, etc. In some examples, the plurality of UEs can be associated with the same network entity and can receive the same CLI training session configuration from the network entity. For example, the CLI training session configuration can be included in a radio resource control (RRC) message received at the UE and/or the plurality of UEs from the network entity (e.g., the RRC message including the CLI training session configuration can be transmitted by the network entity). In some examples, the CLI training session configuration can include the RRC configuration of AP/SP/P NZP-SRS 1112 illustrated in FIG. 11 and/or can include the RRC configuration of AP/SP/P CLI measurement resources illustrated in FIG. 11.

In some examples, the network entity can transmit the CLI training session configuration based on transmitting a radio resource control (RRC) message including one or more parameters associated with the CLI training session configuration. For example, the network entity can transmit the CLI training session configuration using a RRC message such as the RRC configuration of AP/SP/P NZP-SRS 1112 illustrated in FIG. 11 and/or can include the RRC configuration of AP/SP/P CLI measurement resources illustrated in FIG. 11.

In some examples, the process 1550 can further include transmitting, by the network entity, a downlink control information (DCI) including a training session trigger for triggering the plurality of UEs to perform the CLI training session based on the CLI training session configuration. In some examples, the training session trigger can be included in a group-common downlink control information (DCI) received from the network entity and associated with the UE and the one or more additional UEs. In some examples, the training session trigger can be the same as or similar to the dedicated/GC DCI triggering NZP-SRS 1116 illustrated in FIG. 11 and/or can be the same as or similar to the dedicated/GC DCI triggering CLI measurement/reporting 1118 illustrated in FIG. 11.

At block 1554, the process 1550 includes receiving, from the UE, a CLI feedback information associated with performing the CLI training session based on the CLI training session configuration, wherein the CLI feedback information is indicative of CLI between the UE and one or more additional UEs. For example, the CLI feedback information can include one or more CLI feedback information reports transmitted by a respective one or more UEs included in the plurality of UEs. In some cases, the network entity can receive a respective CLI feedback information report from each respective UE included in the plurality of UEs, based on each respective UE receiving and measuring CLI associated with one or more CLI reference signals transmitted by the additional UEs. For example, the CLI feedback information report can be the same as or similar to the L1 CLI report 1124 illustrated in FIG. 11. In some cases, the network entity can receive one or more CLI feedback information reports based on the UE measuring CLI associated with one or more non-zero power (NZP) Sounding Reference Signals (SRS) using one or more SRS resources determined based on the CLI training session configuration transmitted by the network entity.

In some aspects, the CLI feedback information can be indicative of CLI associated with the UE acting as an aggressor UE with respect to the one or more additional UEs. For example, the UE can be the same as or similar to the aggressor UEs 1404 illustrated in FIG. 14. In some examples, the UE acting as an aggressor UE is based on the UE transmitting one or more communications causing CLI with respect to one or more communications received by the one or more additional UEs (e.g., victim UEs, such as the victim UEs 1402 illustrated in FIG. 14). For example, the one or more additional UEs can be victim UEs with respect to the UE. In some aspects, the network entity can configure the UE to act as an aggressor UE (e.g., such as the aggressor UEs 1404 illustrated in FIG. 14) using the CLI training session configuration. In some cases, the network entity can receive CLI feedback information indicative of CLI associated with the UE acting as a victim UE with respect to the one or more additional UEs. For example, the UE acting as a victim UE can be based on one or more communications transmitted by the one or more additional UEs causing CLI with respect to one or more communications received by the UE. In some cases, the one or more additional UEs are aggressor UEs with respect to the UE. In some cases, the network entity can configure the UE to act as a victim UE based on the CLI training session configuration transmitted from the network entity to the UE.

The CLI feedback information can be indicative of CLI between the UE and one or more additional UEs. For example, the one or more additional UEs can be included in the same plurality of UEs as the UE. In some cases, receiving the CLI feedback information is associated with the plurality of UEs performing a CLI training session, wherein the CLI training session is configured by or otherwise based on the CLI training session configuration transmitted by the network entity. In some examples, the network entity can receive from the UE or at least one UE included in the plurality of UEs, a second CLI feedback information, wherein the second CLI feedback information is indicative of a second CLI between the UE and a second set of additional UEs included in the plurality of UEs, wherein the second set of additional UEs is different than the one or more additional UEs.

In some cases, the network entity can receive a UE belief information, wherein the UE belief information is indicative of a determination that the UE is acting as an aggressor with respect to at least one additional UE or a determination that the UE is acting as a victim with respect to at least one additional UE. In some examples, the UE belief information can include or comprise a Received Reference Signal Power (RSRP) value or a Received Signal Strength Indicator (RSSI) value determined based on the UE receiving a CLI reference signal transmitted based on the CLI training session configuration transmitted by the network entity to the UE. In some cases, the UE belief information further comprises a Received Reference Signal Power (RSRP) value or a Received Signal Strength Indicator (RSSI) value determined based on the UE transmitting a CLI reference signal based on the CLI training session configuration.

Figure 16:
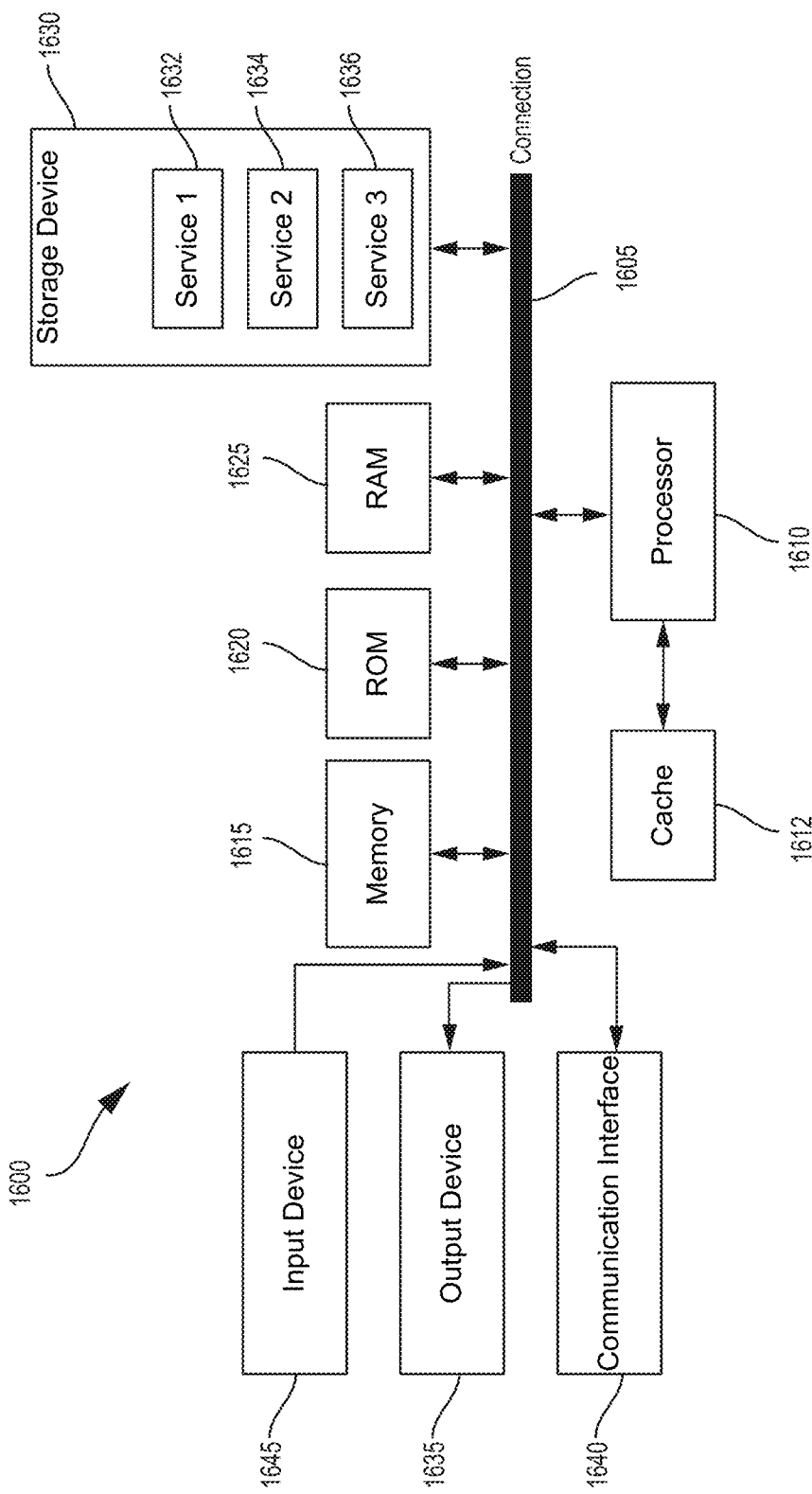
FIG. 16 is a block diagram illustrating an example of a computing system that may be used to implement aspects of the systems and techniques described herein, in accordance with some examples.

FIG. 16 is a block diagram illustrating an example of a computing system 1600 that may be employed to implement aspects of the present disclosure. In particular, FIG. 16 illustrates an example of computing system 1600, which can be for example any computing device making up internal computing system, a remote computing system, a camera, or any component thereof in which the components of the system are in communication with each other using connection 1605. Connection 1605 can be a physical connection using a bus, or a direct connection into processor 1610, such as in a chipset architecture. Connection 1605 can also be a virtual connection, networked connection, or logical connection.

In some embodiments, computing system 1600 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 1600 includes at least one processing unit (CPU or processor) 1610 and connection 1605 that communicatively couples various system components including system memory 1615, such as read-only memory (ROM) 1620 and random-access memory (RAM) 1625 to processor 1610. Computing system 1600 can include a cache 1612 of high-speed memory connected directly with, in close proximity to, or integrated as part of processor 1610.

Processor 1610 can include any general-purpose processor and a hardware service or software service, such as services 1632, 1634, and 1636 stored in storage device 1630, configured to control processor 1610 as well as a special-purpose processor where software instructions are incorporated into the actual processor design. Processor 1610 may essentially be a completely self-contained computing system, containing multiple cores or processors, a bus, memory controller, cache, etc. A multi-core processor may be symmetric or asymmetric.

To enable user interaction, computing system 1600 includes an input device 1645, which can represent any number of input mechanisms, such as a microphone for speech, a touch-sensitive screen for gesture or graphical input, keyboard, mouse, motion input, speech, etc. Computing system 1600 can also include output device 1635, which can be one or more of a number of output mechanisms. In some instances, multimodal systems can enable a user to provide multiple types of input/output to communicate with computing system 1600.

Computing system 1600 can include communications interface 1640, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple™ Lightning™ port/plug, an Ethernet port/plug, a fiber optic port/plug, a proprietary wired port/plug, 3G, 4G, 5G and/or other cellular data network wireless signal transfer, a Bluetooth™ wireless signal transfer, a Bluetooth™ low energy (BLE) wireless signal transfer, an IBEACON™ wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

The communications interface 1640 may also include one or more range sensors (e.g., LIDAR sensors, laser range finders, RF radars, ultrasonic sensors, and infrared (IR) sensors) configured to collect data and provide measurements to processor 1610, whereby processor 1610 can be configured to perform determinations and calculations needed to obtain various measurements for the one or more range sensors. In some examples, the measurements can include time of flight, wavelengths, azimuth angle, elevation angle, range, linear velocity and/or angular velocity, or any combination thereof. The communications interface 1640 may also include one or more Global Navigation Satellite System (GNSS) receivers or transceivers that are used to determine a location of the computing system 1600 based on receipt of one or more signals from one or more satellites associated with one or more GNSS systems. GNSS systems include, but are not limited to, the US-based GPS, the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1630 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (e.g., Level 1 (L1) cache, Level 2 (L2) cache, Level 3 (L3) cache, Level 4 (L4) cache, Level 5 (L5) cache, or other (L #) cache), resistive random-access memory (RRAM/ReRAM), phase change memory (PCM), spin transfer torque RAM (STT-RAM), another memory chip or cartridge, and/or a combination thereof.

The storage device 1630 can include software services, servers, services, etc., that when the code that defines such software is executed by the processor 1610, it causes the system to perform a function. In some embodiments, a hardware service that performs a particular function can include the software component stored in a computer-readable medium in connection with the necessary hardware components, such as processor 1610, connection 1605, output device 1635, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Specific details are provided in the description above to provide a thorough understanding of the embodiments and examples provided herein, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

In some embodiments the computer-readable storage devices, mediums, and memories can include a cable or wireless signal containing a bitstream and the like. However, when mentioned, non-transitory computer-readable storage media expressly exclude media such as energy, carrier signals, electromagnetic waves, and signals per se.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof, in some cases depending in part on the particular application, in part on the desired design, in part on the corresponding technology, etc.

The various illustrative logical blocks, modules, and circuits described in connection with the aspects disclosed herein may be implemented or performed using hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random-access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more DSPs, general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" or "communicatively coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

Illustrative aspects of the disclosure include:

Aspect 1: An apparatus of a user equipment (UE) for wireless communications, comprising: at least one memory; and at least one processor coupled to the at least one memory and configured to: receive a crosslink interference (CLI) training session configuration from a network entity, wherein the CLI training session configuration corresponds to a CLI training session for a plurality of UEs including the UE; determine a CLI feedback information associated with performing the CLI training session; and output the CLI feedback information for transmission, wherein the CLI feedback information is indicative of CLI between the UE and one or more additional UEs.

Aspect 2: The apparatus of Aspect 1, wherein the one or more additional UEs are included in the plurality of UEs.

Aspect 3: The apparatus of any of Aspects 1 to 2, wherein performing the CLI training session is based on receiving a training session trigger from the network entity.

Aspect 4: The apparatus of Aspect 3, wherein the training session trigger is included in a group-common downlink control information (DCI) associated with the UE and the one or more additional UEs.

Aspect 5: The apparatus of any of Aspects 1 to 4, wherein the CLI training session configuration is included in a radio resource control (RRC) message received from the network entity.

Aspect 6: The apparatus of any of Aspects 1 to 5, wherein the at least one processor is configured to output a CLI reference signal for transmission based on the CLI training session configuration.

Aspect 7: The apparatus of Aspect 6, wherein the at least one processor is configured to: receive, one or more CLI feedback information reports transmitted by a respective one or more additional UEs, wherein the one or more CLI feedback information reports correspond to the CLI reference signal.

Aspect 8: The apparatus of any of Aspects 6 to 7, wherein the at least one processor is configured to output the CLI reference signal for transmission using a non-zero power (NZP) Sounding Reference Signal (SRS) using one or more SRS resources determined based on the CLI training session configuration.

Aspect 9: The apparatus of any of Aspects 1 to 8, wherein the at least one processor is configured to receive one or more CLI reference signals, each respective CLI reference signal of the one or more CLI reference signals transmitted by an additional UE included in the plurality of UEs based on the CLI training session configuration.

Aspect 10: The apparatus of Aspect 9, wherein the at least one processor is configured to: output a CLI feedback information report for transmission, wherein the CLI feedback information report is transmitted based on the UE receiving the one or more CLI reference signals.

Aspect 11: The apparatus of any of Aspects 9 to 10, wherein the at least one processor is configured to receive one or more non-zero power (NZP) Sounding Reference Signals (SRS) using one or more SRS resources determined based on the CLI training session configuration.

Aspect 12: The apparatus of any of Aspects 1 to 11, wherein the at least one processor is configured to output the CLI feedback information for transmission in association with the CLI training session.

Aspect 13: The apparatus of Aspect 12, wherein the at least one processor is configured to: output, for transmission to the network entity, a second CLI feedback information, wherein the second CLI feedback information is indicative of a second CLI between the UE and a second set of additional UEs included in the plurality of UEs, wherein the second set of additional UEs is different than the one or more additional UEs.

Aspect 14: The apparatus of Aspect 13, wherein the at least one processor is configured to: output, for transmission to the network entity, a UE belief information, wherein the UE belief information is indicative of a determination that the UE is acting as an aggressor with respect to at least one additional UE or a determination that the UE is acting as a victim with respect to at least one additional UE.

Aspect 15: The apparatus of Aspect 14, wherein the UE belief information further comprises a Received Reference Signal Power (RSRP) value or a Received Signal Strength Indicator (RSSI) value determined based on the UE receiving a CLI reference signal transmitted based on the CLI training session configuration.

Aspect 16: The apparatus of any of Aspects 14 to 15, wherein the UE belief information further comprises a Received Reference Signal Power (RSRP) value or a Received Signal Strength Indicator (RSSI) value determined based on the UE transmitting a CLI reference signal based on the CLI training session configuration.

Aspect 17: The apparatus of any of Aspects 1 to 16, wherein the CLI feedback information is indicative of CLI associated with the UE acting as an aggressor UE with respect to the one or more additional UEs.

Aspect 18: The apparatus of Aspect 17, wherein the UE acting as an aggressor UE is based on the UE transmitting one or more communications causing CLI with respect to one or more communications received by the one or more additional UEs.

Aspect 19: The apparatus of any of Aspects 17 to 18, wherein the one or more additional UEs are victim UEs with respect to the UE.

Aspect 20: The apparatus of any of Aspects 17 to 19, wherein the UE is configured to act as an aggressor UE based on the CLI training session configuration.

Aspect 21: The apparatus of any of Aspects 1 to 20, wherein the CLI feedback information is indicative of CLI associated with the UE acting as a victim UE with respect to the one or more additional UEs.

Aspect 22: The apparatus of Aspect 21, wherein the UE acting as a victim UE is based on one or more communications transmitted by the one or more additional UEs causing CLI with respect to one or more communications received by the UE.

Aspect 23: The apparatus of any of Aspects 21 to 22, wherein the one or more additional UEs are aggressor UEs with respect to the UE.

Aspect 24: The apparatus of any of Aspects 21 to 23, wherein the UE is configured to act as a victim UE based on the CLI training session configuration.

Aspect 25: The apparatus of any of Aspects 1 to 24, wherein the at least one processor is configured to output the CLI feedback information for transmission to the network entity.

Aspect 26: A method for wireless communications at a user equipment (UE), the method comprising: receiving, at the UE, a crosslink interference (CLI) training session configuration from a network entity, wherein the CLI training session configuration corresponds to a CLI training session for a plurality of UEs including the UE; determining, at the UE, a CLI feedback information associated with performing the CLI training session; and transmitting the CLI feedback information, wherein the CLI feedback information is indicative of CLI between the UE and one or more additional UEs.

Aspect 27: The method of Aspect 26, wherein the one or more additional UEs are included in the plurality of UEs.

Aspect 28: The method of any of Aspects 26 to 27, wherein performing the CLI training session is based on receiving a training session trigger from the network entity.

Aspect 29: The method of Aspect 28, wherein the training session trigger is included in a group-common downlink control information (DCI) associated with the UE and the one or more additional UEs.

Aspect 30: The method of any of Aspects 26 to 29, wherein the CLI training session configuration is included in a radio resource control (RRC) message received from the network entity.

Aspect 31: The method of any of Aspects 26 to 30, further comprising transmitting a CLI reference signal based on the CLI training session configuration.

Aspect 32: The method of Aspect 31, further comprising receiving one or more CLI feedback information reports transmitted by a respective one or more additional UEs, wherein the one or more CLI feedback information reports correspond to the transmitted CLI reference signal.

Aspect 33: The method of any of Aspects 31 to 32, further comprising transmitting the CLI reference signal using a non-zero power (NZP) Sounding Reference Signal (SRS) using one or more SRS resources determined based on the CLI training session configuration.

Aspect 34: The method of any of Aspects 26 to 33, further comprising receiving one or more CLI reference signals, each respective CLI reference signal of the one or more CLI reference signals transmitted by an additional UE included in the plurality of UEs based on the CLI training session configuration.

Aspect 35: The method of Aspect 34, further comprising transmitting a CLI feedback information report, wherein the CLI feedback information report is transmitted based on the UE receiving the one or more CLI reference signals.

Aspect 36: The method of any of Aspects 34 to 35, further comprising receiving one or more non-zero power (NZP) Sounding Reference Signals (SRS) using one or more SRS resources determined based on the CLI training session configuration.

Aspect 37: The method of any of Aspects 26 to 36 wherein transmitting the CLI feedback information is associated with the CLI training session.

Aspect 38: The method of Aspect 37, further comprising transmitting, to the network entity, a second CLI feedback information, wherein the second CLI feedback information is indicative of a second CLI between the UE and a second set of additional UEs included in the plurality of UEs, wherein the second set of additional UEs is different than the one or more additional UEs.

Aspect 39: The method of Aspect 38, further comprising transmitting, to the network entity, a UE belief information, wherein the UE belief information is indicative of a determination that the UE is acting as an aggressor with respect to at least one additional UE or a determination that the UE is acting as a victim with respect to at least one additional UE.

Aspect 40: The method of Aspect 39, wherein the UE belief information further comprises a Received Reference Signal Power (RSRP) value or a Received Signal Strength Indicator (RSSI) value determined based on the UE receiving a CLI reference signal transmitted based on the CLI training session configuration.

Aspect 41: The method of any of Aspects 39 to 40, wherein the UE belief information further comprises a Received Reference Signal Power (RSRP) value or a Received Signal Strength Indicator (RSSI) value determined based on the UE transmitting a CLI reference signal based on the CLI training session configuration.

Aspect 42: The method of any of Aspects 26 to 41, wherein the CLI feedback information is indicative of CLI associated with the UE acting as an aggressor UE with respect to the one or more additional UEs.

Aspect 43: The method of Aspect 42, wherein the UE acting as an aggressor UE is based on the UE transmitting one or more communications causing CLI with respect to one or more communications received by the one or more additional UEs.

Aspect 44: The method of any of Aspects 42 to 43, wherein the one or more additional UEs are victim UEs with respect to the UE.

Aspect 45: The method of any of Aspects 42 to 44, wherein the UE is configured to act as an aggressor UE based on the CLI training session configuration.

Aspect 46: The method of any of Aspects 26 to 45, wherein the CLI feedback information is indicative of CLI associated with the UE acting as a victim UE with respect to the one or more additional UEs.

Aspect 47: The method of Aspect 46, wherein the UE acting as a victim UE is based on one or more communications transmitted by the one or more additional UEs causing CLI with respect to one or more communications received by the UE.

Aspect 48: The method of any of Aspects 26 to 47, wherein the one or more additional UEs are aggressor UEs with respect to the UE.

Aspect 49: The method of any of Aspects 46 to 48, wherein the UE is configured to act as a victim UE based on the CLI training session configuration.

Aspect 50: The method of any of Aspects 26 to 49, wherein the at least one processor is configured to transmit the CLI feedback information to the network entity.

Aspect 51: An apparatus of a network entity for wireless communications, comprising: at least one memory; and at least one processor coupled to the at least one memory and configured to: output, for transmission to a user equipment (UE), a crosslink interference (CLI) training session configuration, wherein the CLI training session configuration corresponds to a CLI training session for a plurality of UEs including the UE; and receive, from the UE, a CLI feedback information associated with performing the CLI training session based on the CLI training session configuration, wherein the CLI feedback information is indicative of CLI between the UE and one or more additional UEs.

Aspect 52: The apparatus of Aspect 51, wherein the one or more additional UEs are included in the plurality of UEs.

Aspect 53: The apparatus of any of Aspects 51 to 52, wherein the at least one processor is further configured to output for transmission a downlink control information (DCI) including a training session trigger for triggering the plurality of UEs to perform the CLI training session based on the CLI training session configuration.

Aspect 54: The apparatus of Aspect 53, wherein the training session trigger is included in a group-common downlink control information (DCI) associated with the UE and the one or more additional UEs.

Aspect 55: The apparatus of any of Aspects 51 to 54, wherein, to output the CLI training session configuration, the at least one processor is configured to transmit a radio resource control (RRC) message including one or more parameters associated with the CLI training session configuration.

Aspect 56: The apparatus of any of Aspects 51 to 55, wherein the CLI training session configuration is indicative of one or more parameters for generating and transmitting a CLI reference signal at the UE.

Aspect 57: The apparatus of Aspect 56, wherein the at least one processor is configured to: receive, one or more CLI feedback information reports transmitted by a respective one or more additional UEs, wherein the one or more CLI feedback information reports correspond to the CLI reference signals transmitted and measured based on the CLI training session configuration.

Aspect 58: The apparatus of any of Aspects 51 to 57, wherein the at least one processor is configured to: receive a CLI feedback information report from one or more UEs included in the plurality of UEs, wherein the CLI feedback information report is indicative of a CLI associated with each respective UE receiving one or more CLI reference signals generated based on the CLI training session configuration.

Aspect 59: The apparatus of Aspect 58, wherein the one or more CLI reference signals include one or more non-zero power (NZP) Sounding Reference Signals (SRS) transmitted using one or more SRS resources determined based on the CLI training session configuration.

Aspect 60: The apparatus of any of Aspects 51 to 59, wherein receiving the CLI feedback information is associated with the CLI training session.

Aspect 61: The apparatus of Aspect 60, wherein the at least one processor is configured to: receive a second CLI feedback information, wherein the second CLI feedback information is indicative of a second CLI between the UE and a second set of additional UEs included in the plurality of UEs, wherein the second set of additional UEs is different than the one or more additional UEs.

Aspect 62: The apparatus of Aspect 61, wherein the at least one processor is configured to: receive a UE belief information, wherein the UE belief information is indicative of a determination that the UE is acting as an aggressor with respect to at least one additional UE or a determination that the UE is acting as a victim with respect to at least one additional UE.

Aspect 63: The apparatus of Aspect 62, wherein the UE belief information further comprises a Received Reference Signal Power (RSRP) value or a Received Signal Strength Indicator (RSSI) value determined based on the UE receiving a CLI reference signal transmitted based on the CLI training session configuration.

Aspect 64: The apparatus of any of Aspects 62 to 63, wherein the UE belief information further comprises a Received Reference Signal Power (RSRP) value or a Received Signal Strength Indicator (RSSI) value determined based on the UE transmitting a CLI reference signal based on the CLI training session configuration.

Aspect 65: The apparatus of any of Aspects 51 to 64 wherein the CLI feedback information is indicative of CLI associated with the UE acting as an aggressor UE with respect to the one or more additional UEs.

Aspect 66: The apparatus of Aspect 65, wherein the UE acting as an aggressor UE is based on the UE transmitting one or more communications causing CLI with respect to one or more communications received by the one or more additional UEs.

Aspect 67: The apparatus of any of Aspects 65 to 66, wherein the one or more additional UEs are victim UEs with respect to the UE.

Aspect 68: The apparatus of any of Aspects 66 to 67, wherein the UE is configured to act as an aggressor UE based on the CLI training session configuration.

Aspect 69: The apparatus of any of Aspects 51 to 68, wherein the CLI feedback information is indicative of CLI associated with the UE acting as a victim UE with respect to the one or more additional UEs.

Aspect 70: The apparatus of Aspect 69, wherein the UE acting as a victim UE is based on one or more communications transmitted by the one or more additional UEs causing CLI with respect to one or more communications received by the UE.

Aspect 71: The apparatus of any of Aspects 69 to 70, wherein the one or more additional UEs are aggressor UEs with respect to the UE.

Aspect 72: The apparatus of any of Aspects 69 to 71, wherein the UE is configured to act as a victim UE based on the CLI training session configuration.

Aspect 73: A method for wireless communications at a network entity, the method comprising: transmitting, to a user equipment (UE), a crosslink interference (CLI) training session configuration, wherein the CLI training session configuration corresponds to a CLI training session for a plurality of UEs including the UE; and receiving, from the UE, a CLI feedback information associated with performing the CLI training session based on the CLI training session configuration, wherein the CLI feedback information is indicative of CLU between the UE and one or more additional UEs.

Aspect 74: The apparatus of Aspect 73, wherein the one or more additional UEs are included in the plurality of UEs.

Aspect 75: The apparatus of any of Aspects 73 to 74, wherein the at least one processor is further configured to transmit a downlink control information (DCI) including a training session trigger for triggering the plurality of UEs to perform the CLI training session based on the CLI training session configuration.

Aspect 76: The apparatus of Aspect 75, wherein the training session trigger is included in a group-common downlink control information (DCI) associated with the UE and the one or more additional UEs.

Aspect 77: The apparatus of any of Aspects 73 to 76, wherein to transmit the CLI training session configuration, the at least one processor is configured to transmit a radio resource control (RRC) message including one or more parameters associated with the CLI training session configuration.

Aspect 78: The apparatus of any of Aspects 73 to 77, wherein the CLI training session configuration is indicative of one or more parameters for generating and transmitting a CLI reference signal at the UE.

Aspect 79: The apparatus of Aspect 78, wherein the at least one processor is configured to: receive, one or more CLI feedback information reports transmitted by a respective one or more additional UEs, wherein the one or more CLI feedback information reports correspond to the CLI reference signals transmitted and measured based on the CLI training session configuration.

Aspect 80: The apparatus of any of Aspects 73 to 79, wherein the at least one processor is configured to: receive a CLI feedback information report from one or more UEs included in the plurality of UEs, wherein the CLI feedback information report is indicative of a CLI associated with each respective UE receiving one or more CLI reference signals generated based on the CLI training session configuration.

Aspect 81: The apparatus of Aspect 80, wherein the one or more CLI reference signals include one or more non-zero power (NZP) Sounding Reference Signals (SRS) transmitted using one or more SRS resources determined based on the CLI training session configuration.

Aspect 82: The apparatus of any of Aspects 73 to 81, wherein receiving the CLI feedback information is associated with the CLI training session.

Aspect 83: The apparatus of Aspect 82, wherein the at least one processor is configured to: receive a second CLI feedback information, wherein the second CLI feedback information is indicative of a second CLI between the UE and a second set of additional UEs included in the plurality of UEs, wherein the second set of additional UEs is different than the one or more additional UEs.

Aspect 84: The apparatus of Aspect 83, wherein the at least one processor is configured to: receive a UE belief information, wherein the UE belief information is indicative of a determination that the UE is acting as an aggressor with respect to at least one additional UE or a determination that the UE is acting as a victim with respect to at least one additional UE.

Aspect 85: The apparatus of Aspect 84, wherein the UE belief information further comprises a Received Reference Signal Power (RSRP) value or a Received Signal Strength Indicator (RSSI) value determined based on the UE receiving a CLI reference signal transmitted based on the CLI training session configuration.

Aspect 86: The apparatus of any of Aspects 84 to 85, wherein the UE belief information further comprises a Received Reference Signal Power (RSRP) value or a Received Signal Strength Indicator (RSSI) value determined based on the UE transmitting a CLI reference signal based on the CLI training session configuration.

Aspect 87: The apparatus of any of Aspects 73 to 86 wherein the CLI feedback information is indicative of CLI associated with the UE acting as an aggressor UE with respect to the one or more additional UEs.

Aspect 88: The apparatus of Aspect 87, wherein the UE acting as an aggressor UE is based on the UE transmitting one or more communications causing CLI with respect to one or more communications received by the one or more additional UEs.

Aspect 89: The apparatus of any of Aspects 87 to 88, wherein the one or more additional UEs are victim UEs with respect to the UE.

Aspect 90: The apparatus of any of Aspects 88 to 89, wherein the UE is configured to act as an aggressor UE based on the CLI training session configuration.

Aspect 91: The apparatus of any of Aspects 73 to 90, wherein the CLI feedback information is indicative of CLI associated with the UE acting as a victim UE with respect to the one or more additional UEs.

Aspect 92: The apparatus of Aspect 91, wherein the UE acting as a victim UE is based on one or more communications transmitted by the one or more additional UEs causing CLI with respect to one or more communications received by the UE.

Aspect 93: The apparatus of any of Aspects 91 to 92, wherein the one or more additional UEs are aggressor UEs with respect to the UE.

Aspect 94: The apparatus of any of Aspects 91 to 93, wherein the UE is configured to act as a victim UE based on the CLI training session configuration.

Aspect 95: An apparatus for wireless communications comprising: at least one memory; and at least one processor coupled to the at least one memory, wherein the at least one processor is configured to perform operations in accordance with any one of Aspects 26 to 50.

Aspect 96: An apparatus for wireless communications, comprising means for performing operations in accordance with any one of Aspects 26 to 50.

Aspect 97: A non-transitory computer-readable medium having stored thereon instructions that, when executed by one or more processors, cause the one or more processors to perform operations according to any one of Aspects 26 to 50.

Aspect 98: An apparatus for wireless communications comprising: at least one memory; and at least one processor coupled to the at least one memory, wherein the at least one processor is configured to perform operations in accordance with any one of Aspects 73 to 94.

Aspect 99: An apparatus for wireless communications, comprising means for performing operations in accordance with any one of Aspects 73 to 94.

Aspect 100: A non-transitory computer-readable medium having stored thereon instructions that, when executed by one or more processors, cause the one or more processors to perform operations according to any one of Aspects 73 to 94.

Aspect 101: A non-transitory computer-readable medium having stored thereon instructions that, when executed by one or more processors, cause the one or more processors to perform operations according to any one of Aspects 1 to 25.

Aspect 102: An apparatus comprising means for performing any of the operations of Aspects 1 to 25.

Aspect 103: A non-transitory computer-readable medium having stored thereon instructions that, when executed by one or more processors, cause the one or more processors to perform operations according to any one of Aspects 51 to 72.

Aspect 104: An apparatus comprising means for performing any of the operations of Aspects 1 to 25.

What is claimed is:

1. An apparatus of a user equipment (UE) for wireless communications, comprising:
   at least one memory; and
   at least one processor coupled to the at least one memory and configured to:
      receive a crosslink interference (CLI) training session configuration from a network entity, wherein the CLI training session configuration corresponds to a CLI training session for a plurality of UEs including the UE;
      determine a CLI feedback information associated with performing the CLI training session;
      transmit the CLI feedback information, wherein the CLI feedback information is indicative of CLI between the UE and one or more additional UEs; and
      transmit, to the network entity, a UE belief information, wherein the UE belief information is indicative of a determination that the UE is acting as an aggressor with respect to at least one additional UE or a determination that the UE is acting as a victim with respect to at least one additional UE.

2. The apparatus of claim 1, wherein the one or more additional UEs are included in the plurality of UEs.

3. The apparatus of claim 1, wherein performing the CLI training session is based on receiving a training session trigger from the network entity.

4. The apparatus of claim 3, wherein the training session trigger is included in a group-common downlink control information (DCI) associated with the UE and the one or more additional UEs.

5. The apparatus of claim 1, wherein the CLI training session configuration is included in a radio resource control (RRC) message received from the network entity.

6. The apparatus of claim 1, wherein the at least one processor is configured to transmit a CLI reference signal based on the CLI training session configuration.

7. The apparatus of claim 6, wherein the at least one processor is configured to:
receive, one or more CLI feedback information reports transmitted by a respective one or more additional UEs, wherein the one or more CLI feedback information reports correspond to the transmitted CLI reference signal.

8. The apparatus of claim 6, wherein the at least one processor is configured to transmit the CLI reference signal using a non-zero power (NZP) Sounding Reference Signal (SRS) using one or more SRS resources determined based on the CLI training session configuration.

9. The apparatus of claim 1, wherein the at least one processor is configured to receive one or more CLI reference signals, each respective CLI reference signal of the one or more CLI reference signals transmitted by an additional UE included in the plurality of UEs based on the CLI training session configuration.

10. The apparatus of claim 9, wherein the at least one processor is configured to:
transmit a CLI feedback information report, wherein the CLI feedback information report is transmitted based on the UE receiving the one or more CLI reference signals.

11. The apparatus of claim 9, wherein the at least one processor is configured to receive one or more non-zero power (NZP) Sounding Reference Signals (SRS) using one or more SRS resources determined based on the CLI training session configuration.

12. The apparatus of claim 1, wherein transmitting the CLI feedback information is associated with the CLI training session.

13. The apparatus of claim 12, wherein the at least one processor is configured to:
transmit, to the network entity, a second CLI feedback information, wherein the second CLI feedback information is indicative of a second CLI between the UE and a second set of additional UEs included in the plurality of UEs, wherein the second set of additional UEs is different than the one or more additional UEs.

14. The apparatus of claim 1, wherein the UE belief information further comprises a Received Reference Signal Power (RSRP) value or a Received Signal Strength Indicator (RSSI) value determined based on the UE receiving a CLI reference signal transmitted based on the CLI training session configuration.

15. The apparatus of claim 1, wherein the UE belief information further comprises a Received Reference Signal Power (RSRP) value or a Received Signal Strength Indicator (RSSI) value determined based on the UE transmitting a CLI reference signal based on the CLI training session configuration.

16. The apparatus of claim 1, wherein the determination that the UE is acting as an aggressor is based on the UE transmitting one or more communications causing CLI with respect to one or more communications received by the one or more at least one additional UE.

17. The apparatus of claim 1, wherein the one or more at least one additional UE is a victim UE with respect to the UE.

18. The apparatus of claim 1, wherein the UE is configured to act as an aggressor UE based on the CLI training session configuration.

19. The apparatus of claim 1, wherein the CLI feedback information is indicative of CLI associated with the UE acting as a victim UE with respect to the one or more additional UEs.

20. The apparatus of claim 19, wherein the UE acting as a victim UE is based on one or more communications transmitted by the one or more additional UEs causing CLI with respect to one or more communications received by the UE.

21. The apparatus of claim 19, wherein the one or more additional UEs are aggressor UEs with respect to the UE.

22. The apparatus of claim 19, wherein the UE is configured to act as a victim UE based on the CLI training session configuration.

23. The apparatus of claim 1, wherein the at least one processor is configured to transmit the CLI feedback information to the network entity.

24. A method for wireless communications at a user equipment (UE), the method comprising:
receiving, at the UE, a crosslink interference (CLI) training session configuration from a network entity, wherein the CLI training session configuration corresponds to a CLI training session for a plurality of UEs including the UE;
determining, at the UE, a CLI feedback information associated with performing the CLI training session;
transmitting the CLI feedback information, wherein the CLI feedback information is indicative of CLI between the UE and one or more additional UEs; and
transmitting, to the network entity, a UE belief information, wherein the UE belief information is indicative of a determination that the UE is acting as an aggressor with respect to at least one additional UE or a determination that the UE is acting as a victim with respect to at least one additional UE.

25. An apparatus of a network entity for wireless communications, comprising:
at least one memory; and
at least one processor coupled to the at least one memory and configured to:
transmit, to a user equipment (UE), a crosslink interference (CLI) training session configuration, wherein the CLI training session configuration corresponds to a CLI training session for a plurality of UEs including the UE;
receive, from the UE, a CLI feedback information associated with performing the CLI training session based on the CLI training session configuration, wherein the CLI feedback information is indicative of CLI between the UE and one or more additional UEs; and
receive, from the UE, a UE belief information, wherein the UE belief information is indicative of a determination that the UE is acting as an aggressor with respect to at least one additional UE or a determination that the UE is acting as a victim with respect to at least one additional UE.

26. The apparatus of claim 25, wherein the at least one processor is further configured to transmit a downlink control information (DCI) including a training session trigger for triggering the plurality of UEs to perform the CLI training session based on the CLI training session configuration.

27. The apparatus of claim 25, wherein to transmit the CLI training session configuration, the at least one processor is configured to transmit a radio resource control (RRC)

message including one or more parameters associated with the CLI training session configuration.

28. A method for wireless communications at a network entity, the method comprising:
- transmitting, to a user equipment (UE), a crosslink interference (CLI) training session configuration, wherein the CLI training session configuration corresponds to a CLI training session for a plurality of UEs including the UE;
- receiving, from the UE, a CLI feedback information associated with performing the CLI training session based on the CLI training session configuration, wherein the CLI feedback information is indicative of CLI between the UE and one or more additional UEs; and
- receiving, from the UE, a UE belief information, wherein the UE belief information is indicative of a determination that the UE is acting as an aggressor with respect to at least one additional UE or a determination that the UE is acting as a victim with respect to at least one additional UE.

* * * * *